US010764003B2

(12) United States Patent
Tang et al.

(10) Patent No.: US 10,764,003 B2
(45) Date of Patent: Sep. 1, 2020

(54) BASE STATION, USER TERMINAL, AND CARRIER SCHEDULING INDICATION METHOD

(71) Applicant: Huawei Technologies Co., Ltd., Shenzhen (CN)

(72) Inventors: Hao Tang, Shanghai (CN); Zhengwei Gong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/673,285

(22) Filed: Aug. 9, 2017

(65) Prior Publication Data

US 2017/0338918 A1 Nov. 23, 2017

Related U.S. Application Data

(63) Continuation of application No. PCT/CN2015/083526, filed on Jul. 8, 2015.

(30) Foreign Application Priority Data

Feb. 10, 2015 (CN) .......................... 2015 1 0069646

(51) Int. Cl.
*H04L 1/18* (2006.01)
*H04L 5/00* (2006.01)
(Continued)

(52) U.S. Cl.
CPC .............. *H04L 1/1887* (2013.01); *H04L 1/18* (2013.01); *H04L 5/00* (2013.01); *H04W 72/042* (2013.01); *H04L 5/14* (2013.01)

(58) Field of Classification Search
CPC ............. H04L 12/4633; H04L 12/4641; H04L 45/586; H04L 45/74; H04L 47/18; H04L 69/22; H04W 72/042; H04W 72/1289
See application file for complete search history.

(56) References Cited

U.S. PATENT DOCUMENTS 7,440,419 B2 * 10/2008 Arora .................... H04L 1/1664
370/254
8,228,805 B2 * 7/2012 Arora .................... H04L 1/1664
370/241
(Continued)

FOREIGN PATENT DOCUMENTS

CA 2762320 A1 12/2010
CN 101951684 A 1/2011
(Continued)

OTHER PUBLICATIONS

Nokia, On ServingCellID to CIF mapping for cross-carrier scheduling of enhanced CA for CCs, May 29, 2015, 3GPP, 3GPP TSG-RAN WG1 Meeting #81, Tdoc: R1-152819 (Year: 2015).*
(Continued)

*Primary Examiner* — Eric Nowlin
(74) *Attorney, Agent, or Firm* — Slater Matsil, LLP

(57) ABSTRACT

Embodiments of the present invention disclose a base station, user equipment (UE), and a carrier scheduling indication method to resolve a problem that signaling overheads are relatively large. An embodiment method includes generating, by a processing unit, a carrier assignment indication (CAI) field of a current scheduled carrier according to scheduling statuses of all configured carriers, where the CAI field is used to indicate a total quantity of scheduled carriers in all the configured carriers and an accumulative index value M of the current scheduled carrier, and M represents that the current scheduled carrier is the $M^{th}$ scheduled carrier from the $1^{st}$ configured carrier to the current scheduled carrier; and sending, by a sending unit, downlink control information digital control information (DCI), by carrying the CAI field generated by the processing unit to the DCI, to UE by using the current scheduled carrier.

28 Claims, 7 Drawing Sheets

(51) Int. Cl.
*H04W 72/04* (2009.01)
*H04L 5/14* (2006.01)

(56) References Cited

U.S. PATENT DOCUMENTS

| | | | | |
|---|---|---|---|---|
| 8,537,767 | B2* | 9/2013 | Zhang | H04W 52/365 |
| | | | | 37/252 |
| 8,902,828 | B2* | 12/2014 | Prakash | H04L 1/1671 |
| | | | | 370/329 |
| 9,007,997 | B2* | 4/2015 | Moon | H04W 72/042 |
| | | | | 370/328 |
| 9,191,939 | B2* | 11/2015 | Liang | H04L 1/1607 |
| 9,531,846 | B2* | 12/2016 | Han | H04L 47/283 |
| 9,603,164 | B2* | 3/2017 | Davydov | H04L 5/001 |
| 9,655,066 | B2* | 5/2017 | Lee | H04W 52/365 |
| 9,788,284 | B2* | 10/2017 | Malkamaki | H04W 24/10 |
| 9,979,665 | B2* | 5/2018 | Han | H04L 47/283 |
| 10,079,771 | B2* | 9/2018 | Skog | H04W 28/0205 |
| 10,149,259 | B2* | 12/2018 | Sivanesan | H04W 52/247 |
| 10,397,124 | B2* | 8/2019 | Atli | H04L 47/30 |
| 2006/0164982 | A1* | 7/2006 | Arora | H04L 1/1664 |
| | | | | 370/229 |
| 2006/0191003 | A1* | 8/2006 | Bahk | H04L 63/0254 |
| | | | | 726/14 |
| 2007/0188505 | A1* | 8/2007 | Bivolarski | G06T 1/20 |
| | | | | 345/505 |
| 2008/0316961 | A1 | 12/2008 | Bertrand et al. | |
| 2009/0046629 | A1 | 2/2009 | Jiang et al. | |
| 2010/0034303 | A1 | 2/2010 | Damnjanovic et al. | |
| 2010/0066748 | A1* | 3/2010 | Bivolarski | G06F 9/5066 |
| | | | | 345/505 |
| 2010/0290415 | A1* | 11/2010 | Han | H04L 1/1854 |
| | | | | 370/329 |
| 2011/0080883 | A1* | 4/2011 | Prakash | H04L 5/0037 |
| | | | | 370/329 |
| 2011/0116457 | A1 | 5/2011 | Damnjanovic et al. | |
| 2011/0128922 | A1 | 6/2011 | Chen et al. | |
| 2011/0243016 | A1* | 10/2011 | Zhang | H04W 72/04 |
| | | | | 370/252 |
| 2011/0280164 | A1 | 11/2011 | Luo et al. | |
| 2012/0039407 | A1* | 2/2012 | Tiirola | H04L 1/004 |
| | | | | 375/260 |
| 2012/0243498 | A1* | 9/2012 | Kwon | H04L 5/00 |
| | | | | 370/329 |
| 2013/0170407 | A1* | 7/2013 | Liang | H04L 1/1607 |
| | | | | 370/280 |
| 2013/0329673 | A1 | 12/2013 | Kwon et al. | |
| 2013/0343313 | A1* | 12/2013 | Takeda | H04L 5/001 |
| | | | | 370/329 |
| 2014/0207845 | A1* | 7/2014 | Han | H04L 47/283 |
| | | | | 709/203 |
| 2014/0314007 | A1 | 10/2014 | Chen et al. | |
| 2015/0043394 | A1* | 2/2015 | Lin | H04L 1/1861 |
| | | | | 370/280 |
| 2015/0055600 | A1* | 2/2015 | Prakash | H04W 72/042 |
| | | | | 370/329 |
| 2015/0264655 | A1* | 9/2015 | Lee | H04W 52/365 |
| | | | | 370/329 |
| 2016/0007373 | A1* | 1/2016 | Davydov | H04L 5/001 |
| | | | | 370/329 |
| 2016/0044638 | A1 | 2/2016 | Gao et al. | |
| 2016/0066343 | A1 | 3/2016 | Lin et al. | |
| 2016/0100382 | A1* | 4/2016 | He | H04W 72/042 |
| | | | | 370/329 |
| 2016/0128036 | A1 | 5/2016 | Chen et al. | |
| 2016/0212734 | A1* | 7/2016 | He | H04L 1/1861 |
| 2016/0226630 | A1* | 8/2016 | Zhang | H04L 1/1861 |
| 2016/0337095 | A1 | 11/2016 | Horiuchi et al. | |
| 2017/0126575 | A1* | 5/2017 | Han | H04L 47/283 |
| 2017/0223727 | A1* | 8/2017 | Davydov | H04L 5/001 |
| 2017/0251477 | A1* | 8/2017 | Chung | H04J 11/0069 |
| 2017/0324641 | A1* | 11/2017 | Ertugay | H04L 5/0055 |
| 2018/0102892 | A1* | 4/2018 | Lunttila | H04L 1/1607 |
| 2018/0145796 | A1* | 5/2018 | Liang | H04L 1/1812 |
| 2018/0152860 | A1* | 5/2018 | Huang | H04L 5/0055 |
| 2018/0175969 | A1* | 6/2018 | Guan | H04L 1/18 |
| 2018/0205656 | A1* | 7/2018 | Atli | H04L 47/30 |
| 2018/0234954 | A1* | 8/2018 | Takeda | H04W 28/04 |
| 2018/0242286 | A1* | 8/2018 | Song | H04L 1/0072 |
| 2018/0278400 | A1 | 9/2018 | Chen et al. | |
| 2019/0109796 | A1* | 4/2019 | Chehaibar | H04L 47/283 |
| 2019/0215729 | A1* | 7/2019 | Oyman | H04L 5/0082 |
| 2019/0253985 | A1* | 8/2019 | Dinan | H04W 52/34 |
| 2019/0273811 | A1* | 9/2019 | Agarwal | H04L 69/163 |
| 2020/0022094 | A1* | 1/2020 | You | H04W 76/27 |
| 2020/0107278 | A1* | 4/2020 | Sivanesan | H04W 52/34 |

FOREIGN PATENT DOCUMENTS

| | | | | |
|---|---|---|---|---|
| CN | 101958778 | A | 1/2011 | |
| CN | 102315916 | A | 1/2012 | |
| CN | 102415193 | A | 4/2012 | |
| CN | 102948109 | A | 2/2013 | |
| CN | 103326806 | A | 9/2013 | |
| CN | 102025466 | B | 10/2013 | |
| CN | 103532688 | A | 1/2014 | |
| CN | 104113924 | A | 10/2014 | |
| CN | 105991259 | B * | 5/2019 | H04L 5/0094 |
| EP | 2844003 | A1 | 3/2015 | |
| EP | 2938157 | A1 | 10/2015 | |
| JP | 2012526481 | A | 10/2012 | |
| JP | 2012529238 | A | 11/2012 | |
| JP | 2013513258 | A | 4/2013 | |
| JP | 2013526803 | A | 6/2013 | |
| JP | 2013168389 | A1 | 11/2013 | |
| KR | 20110047970 | A | 5/2011 | |
| KR | 20130016371 | A | 2/2013 | |
| RU | 2485703 | C2 | 6/2013 | |
| WO | WO-2011075037 | A1 * | 6/2011 | H04L 5/0064 |
| WO | 2013139207 | A1 | 9/2013 | |
| WO | 2014094505 | A1 | 6/2014 | |
| WO | 2014169739 | A1 | 10/2014 | |
| WO | WO-2016120726 | A1 * | 8/2016 | H04L 5/0094 |

OTHER PUBLICATIONS

Ericsson et al., Mapping of CIF to component carriers, Jan. 22, 2010, 3GPP, 3GPP TSG RAN WG1 Meeting #59bis, Tdoc: R1-100041 (Year: 2010).*

Nokia, On extension of the cross-carrier scheduling framework to more than 5 CCs, Apr. 24, 2015, 3GPP, 3GPP TSG-RAN WG1 Meeting #80bis, Tdoc: R1-152009 (Year: 2015).*

CATT, Enhancements to DL control signaling for Rel-13 CA, Feb. 13, 2015, 3GPP, 3GPP TSG RAN WG1 Meeting #80, Tdoc: R1-150104 (Year: 2015).*

Qualcomm, Inc., "Number of Bits Conveyed on Multi-bit-ACK PUCCH Format," 3GPP TSG-RAN WG1 #62, R1-104782, Madrid, Spain, Aug. 23-27, 2010, 6 pages.

3GPP, "3rd Generation Partnership Project;Technical Specification Group Radio Access Network; Evolved Universal Terrestrial Radio Access (E-UTRA); Multiplexing and channel coding (Release 12)," 3GPP TS 36.212 V12.3.0 (Dec. 2014), 89 pages.

3GPP, "3rd Generation Partnership Project; Technical Specification Group Radio Access Network; Evolved Universal Terrestrial Radio Access (E-UTRA); Physical layer procedures (Release 12)," 3GPP TS 36.213 V12.4.0 (Dec. 2014), 225 pages.

CATT, "DAI Design for LTE-A," 3GPP TSG RAN WG1 Meeting #60bis, R1-102644, Montreal, Canada, May 10-14, 2010, 4 pages.

Huawei, "A/N transmission in TDD CA," 3GPP TSG RAN WG1 Meeting #61bis, R1-103436, Dresden, Germany, Jun. 28-Jul. 2, 2010, 4 pages.

* cited by examiner

BASE STATION, USER TERMINAL, AND CARRIER SCHEDULING INDICATION METHOD

CROSS-REFERENCE TO RELATED APPLICATIONS

This application is a continuation of International Application No. PCT/CN2015/083526, filed on Jul. 8, 2015, which claims priority to Chinese Patent Application No. 201510069646.X, filed on Feb. 10, 2015. The disclosures of the aforementioned applications are hereby incorporated by reference in their entireties.

TECHNICAL FIELD

The present invention relates to the communications field, and in particular, to a base station, user equipment (UE), and a carrier scheduling indication method.

BACKGROUND

In an evolution process of a Long Term Evolution (LTE for short) system, to increase a spectral bandwidth of the system, a carrier aggregation technology is proposed in the third generation partnership project (3GPP for short). In the carrier aggregation technology, multiple consecutive or inconsecutive carriers are aggregated to form a wider spectrum. When a base station configures multiple carriers, the base station may send data to user equipment (UE for short) simultaneously by using the multiple configured carriers. When the base station sends data to the UE by using a scheduled carrier (a carrier used by the base station to transmit data) in the configured carriers (the carriers configured by the base station), the base station needs to send downlink control information (DCI for short) to the UE by using each scheduled carrier, to indicate to the UE information such as a physical resource block occupied by the base station on the scheduled carrier, and modulation and coding schemes used by the base station, so that the UE receives data according to the received DCI.

In the prior art, in order that UE can learn scheduling statuses of all configured carriers of a base station, the base station may add a downlink assignment indication (DAI for short) 2 field to the DCI sent to the UE, to indicate scheduling statuses of configured carrier different from the current scheduled carrier (the carrier used to transmit the DCI). A quantity of bits of the DAI2 field is determined according to a quantity of the configured carriers of the base station, and the quantity of bits is equal to the quantity of the configured carriers of the base station minus 1.

At least the following problem exists in the prior art. Because in the prior art, the DAI2 field needs to indicate the scheduling statuses of the configured carriers different from the current scheduled carrier, the quantity of bits of the DAI2 field is equal to the quantity of the configured carriers of the base station minus 1. In this way, when the base station configures a relatively large quantity of carriers, the DAI2 field includes more bits. Consequently, the DCI is relatively long, and signaling overheads are relatively large.

SUMMARY

The present embodiments provide a base station, user equipment (UE), and a carrier scheduling indication method, so as to resolve a problem that signaling overheads are relatively large because a quantity of configured carriers of the base station is relatively large.

To achieve the foregoing objective, the following technical solutions are used in the present embodiments.

A first aspect of the present embodiments provides a base station, where the base station includes a processing unit and a sending unit, where the processing unit is configured to generate a carrier assignment indication (CAI) field of a current scheduled carrier according to scheduling statuses of all configured carriers, where the CAI field is used to indicate a total quantity of scheduled carriers in all the configured carriers and an accumulative index value M of the current scheduled carrier, and M represents that the current scheduled carrier is the $M^{th}$ scheduled carrier from the first configured carrier to the current scheduled carrier. Alternatively, the CAI field is used to indicate a number of a preceding scheduled carrier of the current scheduled carrier and a number of a next scheduled carrier of the current scheduled carrier. Also, the sending unit is configured to send downlink control information (DCI), by carrying the CAI field generated by the processing unit to the DCI, to user equipment (UE) by using the current scheduled carrier, where M is an integer greater than or equal to 1.

With reference to the first aspect of the present embodiments, in a possible implementation manner, when the CAI field is used to indicate the total quantity of the scheduled carriers in all the configured carriers and the accumulative index value M of the current scheduled carrier, the processing unit is specifically configured to: obtain the total quantity of the scheduled carriers, and obtain M; obtain a first code according to the total quantity of the scheduled carriers and a first preset mapping relationship, and obtain a second code according to M and a second preset mapping relationship; and combine the first code and the second code to generate the CAI field, where the first mapping relationship is used to indicate the first code corresponding to the total quantity of the scheduled carriers, and the second mapping relationship is used to indicate the second code corresponding to M.

With reference to the first aspect and the foregoing possible implementation manner, in another possible implementation manner, the first code includes $\lceil \log_2 N \rceil$ bits, and the second code includes $\lceil \log_2 N \rceil$ bits, where N is a total quantity of all the configured carriers, and $\lceil \log_2 N \rceil$ represents a value obtained after $\log_2 N$ is rounded up.

With reference to the first aspect and the foregoing possible implementation manners, in another possible implementation manner, the processing unit is further configured to: before obtaining the first code according to the total quantity of the scheduled carriers and the first preset mapping relationship, and obtaining the second code according to M and the second preset mapping relationship, determine whether $\lceil \log_2 N \rceil$ is greater than 2; and the processing unit is specifically configured to: when $\lceil \log_2 N \rceil$ is not greater than 2, obtain the first code according to the total quantity of the scheduled carriers and the first mapping relationship, and obtain the second code according to M and the second mapping relationship.

With reference to the first aspect and the foregoing possible implementation manners, in another possible implementation manner, the processing unit is further configured to: when $\lceil \log_2 N \rceil$ is greater than 2, obtain the first code according to the total quantity of the scheduled carriers and the first mapping relationship, and obtain a third code according to M and a third preset mapping relationship; and combine the first code and the third code to generate the CAI field, where the third mapping relationship is used to indicate the third code corresponding to M, and a quantity of bits of the third code is less than a quantity of bits of the second code.

With reference to the first aspect and the foregoing possible implementation manners, in another possible implementation manner, the first code is located at first $\lceil \log_2 N \rceil$ bits of the CAI field, and the second code is located at last $\lceil \log_2 N \rceil$ bits of the CAI field; or the first code is located at last $\lceil \log_2 N \rceil$ bit of the CAI field, and the second code is located at first $\lceil \log_2 N \rceil$ bits of the CAI field.

With reference to the first aspect and the foregoing possible implementation manners, in another possible implementation manner, a quantity of bits of the CAI field is $\lceil \log_2 N \rceil + a$, and a is an integer greater than or equal to 2 and less than $\lceil \log_2 N \rceil$; and the first code is located at first $\lceil \log_2 N \rceil$ bits of the CAI field, and the third code is located at last a bits of the CAI field; or the first code is located at last $\lceil \log_2 N \rceil$ bits of the CAI field, and the third code is located at first a bits of the CAI field.

With reference to the first aspect and the foregoing possible implementation manners, in another possible implementation manner, when the CAI field is used to indicate the number of the preceding scheduled carrier of the current scheduled carrier and the number of the next scheduled carrier of the current scheduled carrier, the processing unit is specifically configured to: obtain the number of the preceding scheduled carrier of the current scheduled carrier and the number of the next scheduled carrier of the current scheduled carrier; and generate the CAI field according to the number of the preceding scheduled carrier, the number of the next scheduled carrier, and a fourth preset mapping relationship.

With reference to the first aspect and the foregoing possible implementation manners, in another possible implementation manner, the fourth mapping relationship is used to indicate a fourth code corresponding to the number of the preceding scheduled carrier and a fifth code corresponding to the number of the next scheduled carrier; and the processing unit is specifically configured to: obtain the fourth code according to the number of the preceding scheduled carrier and the fourth mapping relationship, and obtain the fifth code according to the number of the next scheduled carrier and the fourth mapping relationship; and combine the fourth code and the fifth code to generate the CAI field.

With reference to the first aspect and the foregoing possible implementation manners, in another possible implementation manner, the fourth mapping relationship is used to indicate a sixth code that is obtained after joint coding is performed on the number of the preceding scheduled carrier and the number of the next scheduled carrier; and a quantity of bits of the sixth code is less than a sum of a quantity of bits of a fourth code and a quantity of bits of a fifth code; and the processing unit is specifically configured to: obtain the sixth code according to the number of the preceding scheduled carrier, the number of the next scheduled carrier, and the fourth mapping relationship, and use the sixth code as the CAI field.

With reference to the first aspect and the foregoing possible implementation manners, in another possible implementation manner, a quantity of bits of the CAI field is $2\lceil \log_2 N \rceil$; and the fourth code is located at first $\lceil \log_2 N \rceil$ bits of the CAI field, and the fifth code is located at last $\lceil \log_2 N \rceil$ bits of the CAI field; or the fourth code is located at last $\lceil \log_2 N \rceil$ bits of the CAI field, and the fifth code is located at first $\lceil \log_2 N \rceil$ bits of the CAI field.

With reference to the first aspect and the foregoing possible implementation manners, in another possible implementation manner, a quantity of bits of the CAI field is $\lceil \log_2(C_N^2+1) \rceil$.

A second aspect of the present embodiments provides UE, where the UE includes a receiving unit and a processing unit, where the receiving unit is configured to receive DCI that is sent by a base station by using at least one current scheduled carrier and that carries a CAI field. The CAI field is used to indicate a total quantity of scheduled carriers in all configured carriers configured by the base station and an accumulative index value M of the current scheduled carrier, and M represents that the current scheduled carrier is the $M^{th}$ scheduled carrier from the first configured carrier to the current scheduled carrier. Alternatively the CAI field is used to indicate a number of a preceding scheduled carrier of the current scheduled carrier and a number of a next scheduled carrier of the current scheduled carrier. The processing unit is configured to obtain the CAI field in the DCI received by the receiving unit, to learn scheduling statuses of all the configured carriers.

With reference to the second aspect of the present embodiments, in a possible implementation manner, the UE further includes a sending unit, where the sending unit is configured to: after the processing unit obtains the CAI field in the DCI, send hybrid automatic repeat request (HARQ) information to the base station, where the HARQ information is used to feedback whether the UE correctly receives data that is sent by the base station by using all the scheduled carriers, and a quantity of bits of the HARQ information is equal to a sum of quantities of bits that are needed to feedback whether the data sent by using all the scheduled carriers is correctly received.

With reference to the second aspect and the foregoing possible implementation manner, in another possible implementation manner, when the CAI field is used to indicate the total quantity of the scheduled carriers in all the configured carriers configured by the base station and the accumulative index value M of the current scheduled carrier, the CAI field includes a first code and a second code, where the first code is a code obtained by the base station according to the total quantity of the scheduled carriers and a first preset mapping relationship, the first mapping relationship is used to indicate the first code corresponding to the total quantity of the scheduled carriers, the second code is a code obtained by the base station according to M and a second preset mapping relationship, and the second mapping relationship is used to indicate the second code corresponding to M; or the CAI field includes a first code and a third code, where the third code is a code obtained by the base station according to M and a third preset mapping relationship, the third mapping relationship is used to indicate the third code corresponding to M, and a quantity of bits of the third code is less than a quantity of bits of a second code.

With reference to the second aspect and the foregoing possible implementation manner, in another possible implementation manner, when the CAI field is used to indicate the number of the preceding scheduled carrier of the current scheduled carrier and the number of the next scheduled carrier of the current scheduled carrier, the CAI field includes a fourth code and a fifth code, where the fourth code is a code obtained by the base station according to the number of the preceding scheduled carrier and a fourth preset mapping relationship, the fifth code is a code obtained by the base station according to the number of the next scheduled carrier and the fourth mapping relationship, and the fourth mapping relationship is used to indicate the fourth code corresponding to the number of the preceding scheduled carrier and the fifth code corresponding to the number of the next scheduled carriers; or the CAI field is a sixth code, where the sixth code is a code obtained by the base station according to the number of the preceding scheduled carrier, the number of the next scheduled carrier, and a fourth preset mapping relationship, and the fourth mapping relationship is used to indicate the sixth code that is obtained after joint coding is performed on the number of the preceding scheduled carrier and the number of the next scheduled carrier.

With reference to the second aspect and the foregoing possible implementation manner, in another possible implementation manner, the processing unit is further configured to determine the total quantity of the scheduled carriers and the accumulative index value M of the at least one current scheduled carrier according to the CAI field; and the sending unit is specifically configured to send the HARQ information to the base station according to the total quantity of the scheduled carriers and the accumulative index value M of the at least one current scheduled carrier that are determined by the processing unit.

With reference to the second aspect and the foregoing possible implementation manner, in another possible implementation manner, the processing unit is further configured to: determine the number of the preceding scheduled carrier of the at least one current scheduled carrier and the number of the next scheduled carrier of the at least one current scheduled carrier according to the CAI field, and determine the total quantity of the scheduled carriers according to the number of the preceding scheduled carrier of the at least one current scheduled carrier and the number of the next scheduled carrier of the at least one current scheduled carrier; and the sending unit is specifically configured to send the HARQ information to the base station according to the total quantity of the scheduled carriers, the number of the preceding scheduled carrier of the at least one current scheduled carrier, and the number of the next scheduled carrier of the at least one current scheduled carrier that are determined by the processing unit.

With reference to the second aspect and the foregoing possible implementation manner, in another possible implementation manner, when the CAI field includes the first code and the second code, the processing unit is specifically configured to: for the CAI field, obtain the total quantity of the scheduled carriers according to the first mapping relationship and the first code, and obtain M according to the second mapping relationship and the second code.

With reference to the second aspect and the foregoing possible implementation manner, in another possible implementation manner, when the CAI field includes the first code and the third code, the processing unit is specifically configured to: for the CAI field, obtain the total quantity of the scheduled carriers according to the first mapping relationship and the first code, and obtain M according to the third mapping relationship and the third code.

With reference to the second aspect and the foregoing possible implementation manner, in another possible implementation manner, when the CAI field includes the fourth code and the fifth code, the processing unit is specifically configured to: for the CAI field, obtain the number of the preceding scheduled carrier according to the fourth code and the fourth mapping relationship, and obtain the number of the next scheduled carrier according to the fifth code and the fourth mapping relationship.

With reference to the second aspect and the foregoing possible implementation manner, in another possible implementation manner, when the CAI field is the sixth code, the processing unit is specifically configured to: for the CAI field, obtain the number of the preceding scheduled carrier and the number of the next scheduled carrier according to the sixth code and the fourth mapping relationship.

A third aspect of the present embodiments provides a carrier scheduling indication method, where the method includes: generating, by a base station, a CAI field of a current scheduled carrier according to scheduling statuses of all configured carriers configured by the base station, where the CAI field is used to indicate a total quantity of scheduled carriers in all the configured carriers and an accumulative index value M of the current scheduled carrier, and M represents that the current scheduled carrier is the $M^{th}$ scheduled carrier from the first configured carrier to the current scheduled carrier; or the CAI field is used to indicate a number of a preceding scheduled carrier of the current scheduled carrier and a number of a next scheduled carrier of the current scheduled carrier; and sending, by the base station, DCI, by carrying the CAI field generated by the processing unit to the DCI, to UE by using the current scheduled carrier, where M is an integer greater than or equal to 1.

With reference to the third aspect of the present embodiments, in a possible implementation manner, when the CAI field is used to indicate the total quantity of the scheduled carriers in all the configured carriers and the accumulative index value M of the current scheduled carrier, the generating, by a base station, a CAI field of a current scheduled carrier according to scheduling statuses of all configured carriers configured by the base station includes: obtaining, by the base station, the total quantity of the scheduled carriers, and obtaining M; obtaining, by the base station, a first code according to the total quantity of the scheduled carriers and a first preset mapping relationship, and obtaining a second code according to M and a second preset mapping relationship, where the first mapping relationship is used to indicate the first code corresponding to the total quantity of the scheduled carriers, and the second mapping relationship is used to indicate the second code corresponding to M; and combining, by the base station, the first code and the second code to generate the CAI field.

With reference to the third aspect and the foregoing possible implementation manner, in another possible implementation manner, the first code includes $\lceil \log_2 N \rceil$ bits, and the second code includes $\lceil \log_2 N \rceil$ bits, where N is a total quantity of all the configured carriers, and $\lceil \log_2 N \rceil$ represents a value obtained after $\log_2 N$ is rounded up.

With reference to the third aspect and the foregoing possible implementation manner, in another possible implementation manner, before the obtaining, by the base station, a first code according to the total quantity of the scheduled carriers and a first preset mapping relationship, and obtaining a second code according to M and a second preset mapping relationship, the method further includes: determining, by the base station, whether $\lceil \log_2 N \rceil$ is greater than 2; and the obtaining, by the base station, a first code according to the total quantity of the scheduled carriers and a first preset mapping relationship, and obtaining a second code according to M and a second preset mapping relationship includes: when $\lceil \log_2 N \rceil$ is not greater than 2, obtaining, by the base station, the first code according to the total quantity of the scheduled carriers and the first mapping relationship, and obtaining the second code according to M and the second mapping relationship.

With reference to the third aspect and the foregoing possible implementation manner, in another possible implementation manner, the method further includes: when $\lceil \log_2 N \rceil$ is greater than 2, obtaining, by the base station, the first code according to the total quantity of the scheduled carriers and the first mapping relationship, and obtaining a third code according to M and a third preset mapping relationship, where the third mapping relationship is used to indicate the third code corresponding to M, and a quantity of bits of the third code is less than a quantity of bits of the second code; and combining, by the base station, the first code and the third code to generate the CAI field.

With reference to the third aspect and the foregoing possible implementation manners, in another possible implementation manner, the first code is located at first $\lceil \log_2 N \rceil$ bits of the CAI field, and the second code is located at last $\lceil \log_2 N \rceil$ bits of the CAI field; or the first code is located at last $\lceil \log_2 N \rceil$ bits of the CAI field, and the second code is located at first $\lceil \log_2 N \rceil$ bits of the CAI field.

With reference to the third aspect and the foregoing possible implementation manners, in another possible implementation manner, a quantity of bits of the CAI field is $\lceil \log_2 N \rceil + a$, and a is an integer greater than or equal to 2 and less than $\lceil \log_2 N \rceil$, where the first code is located at first $\lceil \log_2 N \rceil$ bits of the CAI field, and the third code is located at last a bits of the CAI field; or the first code is located at last $\lceil \log_2 N \rceil$ bits of the CAI field, and the third code is located at first a bits of the CAI field.

With reference to the third aspect and the foregoing possible implementation manner, in another possible implementation manner, when the CAI field is used to indicate the number of the preceding scheduled carrier of the current scheduled carrier and the number of the next scheduled carrier of the current scheduled carrier, the generating, by a base station, a CAI field of a current scheduled carrier according to scheduling statuses of all configured carriers configured by the base station includes: obtaining, by the base station, the number of the preceding scheduled carrier of the current scheduled carrier and the number of the next scheduled carrier of the current scheduled carrier; and generating, by the base station, the CAI field according to the number of the preceding scheduled carrier, the number of the next scheduled carrier, and a fourth preset mapping relationship.

With reference to the third aspect and the foregoing possible implementation manner, in another possible implementation manner, the fourth mapping relationship is used to indicate a fourth code corresponding to the number of the preceding scheduled carrier and a fifth code corresponding to the number of the next scheduled carrier; and the generating, by the base station, the CAI field according to the number of the preceding scheduled carrier, the number of the next scheduled carrier, and a fourth preset mapping relationship includes: obtaining, by the base station, the fourth code according to the number of the preceding scheduled carrier and the fourth mapping relationship, and obtaining the fifth code according to the number of the next scheduled carrier and the fourth mapping relationship; and combining, by the base station, the fourth code and the fifth code to generate the CAI field.

With reference to the third aspect and the foregoing possible implementation manner, in another possible implementation manner, the fourth mapping relationship is used to indicate a sixth code that is obtained after joint coding is performed on the number of the preceding scheduled carrier and the number of the next scheduled carrier; and a quantity of bits of the sixth code is less than a sum of a quantity of bits of a fourth code and a quantity of bits of a fifth code; and the generating, by the base station, the CAI field according to the number of the preceding scheduled carrier, the number of the next scheduled carrier, and a fourth preset mapping relationship includes: obtaining, by the base station, the sixth code according to the number of the preceding scheduled carrier, the number of the next scheduled carrier, and the fourth preset mapping relationship; and using, by the base station, the sixth code as the CAI field.

With reference to the third aspect and the foregoing possible implementation manners, in another possible implementation manner, a quantity of bits of the CAI field is $2\lceil \log_2 N \rceil$; and the fourth code is located at first $\lceil \log_2 N \rceil$ bits of the CAI field, and the fifth code is located at last $\lceil \log_2 N \rceil$ bits of the CAI field; or the fourth code is located at last $\lceil \log_2 N \rceil$ bits of the CAI field, and the fifth code is located at first $\lceil \log_2 N \rceil$ bits of the CAI field.

With reference to the third aspect and the foregoing possible implementation manners, in another possible implementation manner, a quantity of bits of the CAI field is $\lceil \log_2(C_N^2+1) \rceil$.

A fourth aspect of the present embodiments provides a carrier scheduling indication method, including: receiving, by user equipment UE, DCI that is sent by a base station by using at least one current scheduled carrier and that carries a carrier assignment indication (CAI) field, where the CAI field is used to indicate a total quantity of scheduled carriers in all configured carriers configured by the base station and an accumulative index value M of the current scheduled carrier, and M represents that the current scheduled carrier is the $M^{th}$ scheduled carrier from the first configured carrier to the current scheduled carrier; or the CAI field is used to indicate a number of a preceding scheduled carrier of the current scheduled carrier and a number of a next scheduled carrier of the current scheduled carrier; and obtaining, by the UE, the CAI field in the DCI, to learn scheduling statuses of all the configured carriers.

With reference to the fourth aspect of the present embodiments, in a possible implementation manner, after the obtaining, by the UE, the CAI field in the DCI, the method further includes: sending, by the UE, HARQ information to the base station, where the HARQ information is used to feedback whether the UE correctly receives data that is sent by the base station by using all the scheduled carriers, and a quantity of bits of the HARQ information is equal to a sum of quantities of bits that are needed to feedback whether the data sent by using all the scheduled carriers is correctly received.

With reference to the fourth aspect and the foregoing possible implementation manner, in another possible implementation manner, when the CAI field is used to indicate the total quantity of the scheduled carriers in all the configured carriers configured by the base station and the accumulative index value M of the current scheduled carrier, the CAI field includes a first code and a second code, where the first code is a code obtained by the base station according to the total quantity of the scheduled carriers and a first preset mapping relationship, the first mapping relationship is used to indicate the first code corresponding to the total quantity of the scheduled carriers, the second code is a code obtained by the base station according to M and a second preset mapping relationship, and the second mapping relationship is used to indicate the second code corresponding to M; or the CAI field includes a first code and a third code, where the third code is a code obtained by the base station according to M and a third preset mapping relationship, the third mapping relationship is used to indicate the third code corresponding to M, and a quantity of bits of the third code is less than a quantity of bits of a second code.

With reference to the fourth aspect and the foregoing possible implementation manner, in another possible implementation manner, when the CAI field is used to indicate the number of the preceding scheduled carrier of the current scheduled carrier and the number of the next scheduled carrier of the current scheduled carrier, the CAI field includes a fourth code and a fifth code, where the fourth code is a code obtained by the base station according to the number of the preceding scheduled carrier and a fourth preset mapping relationship, the fifth code is a code obtained by the base station according to the number of the next scheduled carrier and the fourth mapping relationship, and the fourth mapping relationship is used to indicate the fourth code corresponding to the number of the preceding scheduled carrier and the fifth code corresponding to the number of the next scheduled carriers; or the CAI field is a sixth code, where the sixth code is a code obtained by the base station according to the number of the preceding scheduled carrier, the number of the next scheduled carrier, and a fourth preset mapping relationship, and the fourth mapping relationship is used to indicate the sixth code that is obtained after joint coding is performed on the number of the preceding scheduled carrier and the number of the next scheduled carrier.

With reference to the fourth aspect and the foregoing possible implementation manner, in another possible implementation manner, the sending, by the UE, HARQ information to the base station includes: determining, by the UE, the total quantity of the scheduled carriers and the accumulative index value M of the at least one current scheduled carrier according to the CAI field; and sending, by the UE, the HARQ information to the base station according to the total quantity of the scheduled carriers and the accumulative index value M of the at least one current scheduled carrier.

With reference to the fourth aspect and the foregoing possible implementation manner, in another possible implementation manner, the sending, by the UE, HARQ information to the base station includes: determining, by the UE, the number of the preceding scheduled carrier of the at least one current scheduled carrier and the number of the next scheduled carrier of the at least one current scheduled carrier according to the CAI field; determining, by the UE, the total quantity of the scheduled carriers according to the number of the preceding scheduled carrier of the at least one current scheduled carrier and the number of the next scheduled carrier of the at least one current scheduled carrier; and sending, by the UE, the HARQ information to the base station according to the total quantity of the scheduled carriers, the number of the preceding scheduled carrier of the at least one current scheduled carrier, and the number of the next scheduled carrier of the at least one current scheduled carrier.

With reference to the fourth aspect and the foregoing possible implementation manner, in another possible implementation manner, when the CAI field includes the first code and the second code, the determining, by the UE, the total quantity of the scheduled carriers and the accumulative index value M of the at least one current scheduled carrier according to the CAI field includes: for the CAI field, obtaining, by the UE, the total quantity of the scheduled carriers according to the first mapping relationship and the first code, and obtaining M according to the second mapping relationship and the second code.

With reference to the fourth aspect and the foregoing possible implementation manner, in another possible implementation manner, when the CAI field includes the first code and the third code, the determining, by the UE, the total quantity of the scheduled carriers and the accumulative index value M of the at least one current scheduled carrier according to the CAI field includes: for the CAI field, obtaining, by the UE, the total quantity of the scheduled carriers according to the first mapping relationship and the first code, and obtaining M according to the third mapping relationship and the third code.

With reference to the fourth aspect and the foregoing possible implementation manner, in another possible implementation manner, when the CAI field includes the fourth code and the fifth code, the determining, by the UE, the number of the preceding scheduled carrier of the at least one current scheduled carrier and the number of the next scheduled carrier of the at least one current scheduled carrier according to the CAI field includes: for the CAI field, obtaining, by the UE, the number of the preceding scheduled carrier according to the fourth code and the fourth mapping relationship, and obtaining the number of the next scheduled carrier according to the fifth code and the fourth mapping relationship.

With reference to the fourth aspect and the foregoing possible implementation manner, in another possible implementation manner, when the CAI field is the sixth code, the determining, by the UE, the number of the preceding scheduled carrier of the at least one current scheduled carrier and the number of the next scheduled carrier of the at least one current scheduled carrier according to the CAI field includes: for the CAI field, obtaining, by the UE, the number of the preceding scheduled carrier and the number of the next scheduled carrier according to the sixth code and the fourth mapping relationship.

According to the base station, the UE, and the carrier scheduling indication method that are provided in the embodiments of the present invention, after generating a CAI field of a current scheduled carrier according to scheduling statuses of all configured carriers configured by the base station, the base station adds the generated CAI field to DCI and sends the DCI to UE by using the current scheduled carrier. In the present embodiments, the CAI field that is sent by the base station to the UE and that is used to perform carrier scheduling indication indicates a total quantity of all scheduled carriers and an accumulative index value of the current scheduled carrier, or indicates a number of a preceding scheduled carrier of the current scheduled carrier and a number of a next scheduled carrier of the current scheduled carrier, that is, the CAI field in the present embodiments indicates scheduling information of a scheduled carrier. However, in the prior art, a DAI2 field that is sent by a base station to UE and that is used to perform carrier scheduling indication indicates a scheduling status of each configured carrier in all configured carriers different from the current scheduled carrier. The total quantity of the scheduled carriers of the base station is less than or equal to a total quantity of the configured carriers of the base station. Therefore, compared with the prior art, when the base station configures a relatively large quantity of carriers, a CAI field generated by the base station according to the method provided in the embodiments of the present invention includes a relatively small quantity of bits. In this way, a length of a DCI field is reduced, and signaling overheads are reduced.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present embodiments.

In addition, the terms "system" and "network" may be used interchangeably in this specification.

The symbol "⌈ ⌉" in the embodiments of the present invention represents rounding up.

Figure 1:
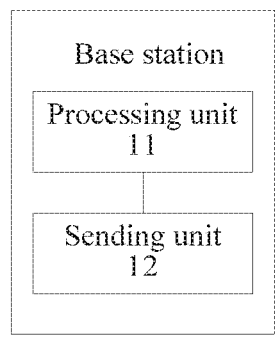
FIG. 1 is a schematic structural diagram of a base station according to an embodiment of the present invention.

An embodiment of the present invention provides a base station. As shown in FIG. 1, the base station includes a processing unit 11 and a sending unit 12.

The processing unit 11 is configured to generate a carrier assignment indication field of a current scheduled carrier according to scheduling statuses of all configured carriers.

The carrier assignment indicator (CAI) field is used to indicate a total quantity of scheduled carriers in all the configured carriers and an accumulative index value M of the current scheduled carrier, and M represents that the current scheduled carrier is the $M^{th}$ scheduled carrier from the first configured carrier to the current scheduled carrier; or the CAI field is used to indicate a number of a preceding scheduled carrier of the current scheduled carrier and a number of a next scheduled carrier of the current scheduled carrier.

The sending unit 12 is configured to: add the CAI field generated by the processing unit 11 to downlink control indicator (DCI), and send the DCI to a user equipment (UE) by using the current scheduled carrier.

M is an integer greater than or equal to 1.

In this embodiment of the present invention, further, when the CAI field is used to indicate the total quantity of the scheduled carriers in all the configured carriers and the accumulative index value M of the current scheduled carrier, the processing unit 11 is specifically configured to: obtain the total quantity of the scheduled carriers, and obtain M; obtain a first code according to the total quantity of the scheduled carriers and a first preset mapping relationship, and obtain a second code according to M and a second preset mapping relationship; and combine the first code and the second code to generate the CAI field, where the first mapping relationship is used to indicate the first code corresponding to the total quantity of the scheduled carriers, and the second mapping relationship is used to indicate the second code corresponding to M.

Optionally, either of quantities of bits of the first code and the second code are $\lceil \log_2 N \rceil$.

N is a total quantity of all the configured carriers, and $\lceil \log_2 N \rceil$ represents a value obtained after $\log_2 N$ is rounded up.

In this embodiment of the present invention, further, the processing unit 11 is further configured to: before obtaining the first code according to the total quantity of the scheduled carriers and the first preset mapping relationship, and obtaining the second code according to M and the second preset mapping relationship, determine whether $\lceil \log_2 N \rceil$ is greater than 2; and the processing unit 11 is specifically configured to: when $\lceil \log_2 N \rceil$ is not greater than 2, obtain the first code according to the total quantity of the scheduled carriers and the first mapping relationship, and obtain the second code according to M and the second mapping relationship.

In this embodiment of the present invention, further, the processing unit 11 is further configured to: when $\lceil \log_2 N \rceil$ is greater than 2, obtain the first code according to the total quantity of the scheduled carriers and the first mapping relationship, and obtain a third code according to M and a third preset mapping relationship; and combine the first code and the third code to generate the CAI field.

The third mapping relationship is used to indicate the third code corresponding to M, and a quantity of bits of the third code is less than a quantity of bits of the second code.

In this embodiment of the present invention, further, when the CAI field is generated according to the first code and the second code, a quantity of bits of the CAI field is $2\lceil \log_2 N \rceil$.

The first code is located at first $\lceil \log_2 N \rceil$ bits of the CAI field, and the second code is located at last $\lceil \log_2 N \rceil$ bits of the CAI field; or the first code is located at last $\lceil \log_2 N \rceil$ bits of the CAI field, and the second code is located at first $\lceil \log_2 N \rceil$ bits of the CAI field.

In this embodiment of the present invention, further, when the CAI field is generated according to the first code and the third code, a quantity of bits of the CAI field is $\lceil \log_2 N \rceil + a$.

a is an integer greater than or equal to 2 and less than $\lceil \log_2 N \rceil$. The first code is located at first $\lceil \log_2 N \rceil$ bits of the CAI field, and the third code is located at last a bits of the CAI field; or the first code is located at last $\lceil \log_2 N \rceil$ bits of the CAI field, and the third code is located at first a bits of the CAI field.

In this embodiment of the present invention, further, when the CAI field is used to indicate the number of the preceding scheduled carrier of the current scheduled carrier and the number of the next scheduled carrier of the current scheduled carrier, the processing unit 11 is specifically configured to: obtain the number of the preceding scheduled carrier of the current scheduled carrier and the number of the next scheduled carrier of the current scheduled carrier; and generate the CAI field according to the number of the preceding scheduled carrier, the number of the next scheduled carrier, and a fourth preset mapping relationship.

In this embodiment of the present invention, further, the fourth mapping relationship is used to indicate a fourth code corresponding to the number of the preceding scheduled carrier and a fifth code corresponding to the number of the next scheduled carrier; and the processing unit 11 is specifically configured to: obtain the fourth code according to the number of the preceding scheduled carrier and the fourth mapping relationship, and obtain the fifth code according to the number of the next scheduled carrier and the fourth mapping relationship; and combine the fourth code and the fifth code to generate the CAI field.

In this embodiment of the present invention, further, the fourth mapping relationship is used to indicate a sixth code that is obtained after joint coding is performed on the number of the preceding scheduled carrier and the number of the next scheduled carrier; and a quantity of bits of the sixth code is less than a sum of a quantity of bits of the fourth code and a quantity of bits of the fifth code; and the processing unit 11 is specifically configured to: obtain the sixth code according to the number of the preceding scheduled carrier, the number of the next scheduled carrier, and the fourth mapping relationship, and use the sixth code as the CAI field.

In this embodiment of the present invention, further, when the CAI field is generated according to the fourth code and the fifth code, a quantity of bits of the CAI field is $2\lceil \log_2 N \rceil$.

The fourth code is located at first $\lceil \log_2 N \rceil$ bits of the CAI field, and the fifth code is located at last $\lceil \log_2 N \rceil$ bits of the CAI field; or the fourth code is located at last $\lceil \log_2 N \rceil$ bits of the CAI field, and the fifth code is located at first $\lceil \log_2 N \rceil$ bits of the CAI field.

In this embodiment of the present invention, further, when the sixth code is used as the CAI field, a quantity of bits of the CAI field may be $\lceil \log_2(C_N^2+1) \rceil$. For a specific coding scheme of the sixth code, refer to an implementation manner of the present invention described in FIG. 9 in the following specification.

It should be noted that, for specific working processes of the functional modules of the base station in this embodiment of the present invention, refer to specific descriptions of a corresponding process in a method embodiment, and details are not described in this embodiment of the present invention.

According to the base station provided in this embodiment of the present invention, after generating a CAI field of a current scheduled carrier according to scheduling statuses of all configured carriers configured by the base station, the base station adds the generated CAI field to DCI and sends the DCI to UE by using the current scheduled carrier. In the present embodiments, the CAI field that is sent by the base station to the UE and that is used to perform carrier scheduling indication indicates a total quantity of all scheduled carriers and an accumulative index value of the current scheduled carrier, or indicates a number of a preceding scheduled carrier of the current scheduled carrier and a number of a next scheduled carrier of the current scheduled carrier, that is, the CAI field in the present embodiments indicates scheduling information of a scheduled carrier. However, in the prior art, a DAI2 field that is sent by a base station to UE and that is used to perform carrier scheduling indication indicates a scheduling status of each configured carrier in all configured carriers different from the current scheduled carrier. The total quantity of the scheduled carriers of the base station is less than or equal to a total quantity of the configured carriers of the base station. Therefore, compared with the prior art, when the base station configures a relatively large quantity of carriers, a CAI field generated by the base station according to a method provided in an embodiment of the present invention includes a relatively small quantity of bits. In this way, a length of a DCI field is reduced, and signaling overheads are reduced.

Figure 2:
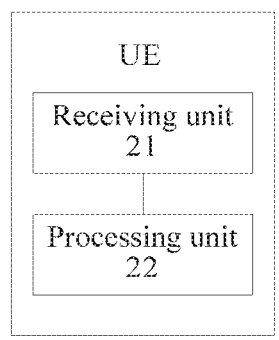
FIG. 2 is a schematic structural diagram of a user equipment (UE) according to another embodiment of the present invention.

Another embodiment of the present invention provides UE. As shown in FIG. 2, the UE may include a receiving unit 21 and a processing unit 22.

The receiving unit 21 is configured to receive downlink control information (DCI) that is sent by a base station by using at least one current scheduled carrier and that carries a CAI field.

The CAI field is used to indicate a total quantity of scheduled carriers in all configured carriers configured by the base station and an accumulative index value M of the current scheduled carrier, and M represents that the current scheduled carrier is the $M^{th}$ scheduled carrier from the first configured carrier to the current scheduled carrier; or the CAI field is used to indicate a number of a preceding scheduled carrier of the current scheduled carrier and a number of a next scheduled carrier of the current scheduled carrier.

The processing unit 22 is configured to obtain the CAI field in the DCI received by the receiving unit 21, to learn scheduling statuses of all the configured carriers.

Figure 3:
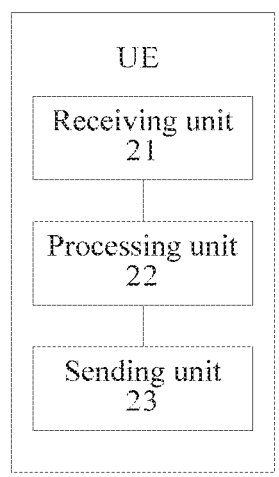
FIG. 3 is a schematic structural diagram of another UE according to another embodiment of the present invention.

In this embodiment of the present invention, further, as shown in FIG. 3, the UE may further include a sending unit 23.

The sending unit 23 is configured to: after the processing unit 22 obtains the CAI field in the DCI, send hybrid automatic repeat request (HARQ) information to the base station.

The HARQ information is used to feedback whether the UE correctly receives data that is sent by the base station by using all the scheduled carriers, and a quantity of bits of the HARQ information is equal to a sum of quantities of bits that are needed to feedback whether the data sent by using all the scheduled carriers is correctly received.

In this embodiment of the present invention, further, when the CAI field is used to indicate the total quantity of the scheduled carriers in all the configured carriers configured by the base station and the accumulative index value M of the current scheduled carrier, in a possible implementation manner, the CAI field includes a first code and a second code, where the first code is a code obtained by the base station according to the total quantity of the scheduled carriers and a first preset mapping relationship, the first mapping relationship is used to indicate the first code corresponding to the total quantity of the scheduled carriers, the second code is a code obtained by the base station according to M and a second preset mapping relationship, and the second mapping relationship is used to indicate the second code corresponding to M; or in another possible implementation manner, the CAI field includes a first code and a third code, where the third code is a code obtained by the base station according to M and a third preset mapping relationship, the third mapping relationship is used to indicate the third code corresponding to M, and a quantity of bits of the third code is less than a quantity of bits of a second code.

In this embodiment of the present invention, further, when the CAI field is used to indicate the number of the preceding scheduled carrier of the current scheduled carrier and the number of the next scheduled carrier of the current scheduled carrier, in a possible implementation manner, the CAI field includes a fourth code and a fifth code, where the fourth code is a code obtained by the base station according to the number of the preceding scheduled carrier and a fourth preset mapping relationship, the fifth code is a code obtained by the base station according to the number of the next scheduled carrier and the fourth mapping relationship, and the fourth mapping relationship is used to indicate the fourth code corresponding to the number of the preceding scheduled carrier and the fifth code corresponding to the number of the next scheduled carriers; or in another possible implementation manner, the CAI field is a sixth code, where the sixth code is a code obtained by the base station according to the number of the preceding scheduled carrier, the number of the next scheduled carrier, and a fourth preset mapping relationship, and the fourth mapping relationship is used to indicate the sixth code that is obtained after joint coding is performed on the number of the preceding scheduled carrier and the number of the next scheduled carrier.

In this embodiment of the present invention, further, the processing unit 22 is further configured to determine the total quantity of the scheduled carriers and the accumulative index value M of the at least one current scheduled carrier according to the CAI field; and the sending unit 23 is specifically configured to send the HARQ information to the base station according to the total quantity of the scheduled carriers and the accumulative index value M of the at least one current scheduled carrier that are determined by the processing unit 22.

In this embodiment of the present invention, further, the processing unit 22 is further configured to: determine the number of the preceding scheduled carrier of the at least one current scheduled carrier and the number of the next scheduled carrier of the at least one current scheduled carrier according to the CAI field, and determine the total quantity of the scheduled carriers according to the number of the preceding scheduled carrier of the at least one current scheduled carrier and the number of the next scheduled carrier of the at least one current scheduled carrier; and the sending unit 23 is specifically configured to send the HARQ information to the base station according to the total quantity of the scheduled carriers, the number of the preceding scheduled carrier of the at least one current scheduled carrier, and the number of the next scheduled carrier of the at least one current scheduled carrier that are determined by the processing unit 22.

In this embodiment of the present invention, further, when the CAI field includes the first code and the second code, the processing unit 22 is specifically configured to: for the CAI field, obtain the total quantity of the scheduled carriers according to the first mapping relationship and the first code, and obtain M according to the second mapping relationship and the second code.

In this embodiment of the present invention, further, when the CAI field includes the first code and the third code, the processing unit 22 is specifically configured to: for the CAI field, obtain the total quantity of the scheduled carriers according to the first mapping relationship and the first code, and obtain M according to the third mapping relationship and the third code.

In this embodiment of the present invention, further, when the CAI field includes the fourth code and the fifth code, the processing unit 22 is specifically configured to: for the CAI field, obtain the number of the preceding scheduled carrier according to the fourth code and the fourth mapping relationship, and obtain the number of the next scheduled carrier according to the fifth code and the fourth mapping relationship.

In this embodiment of the present invention, further, when the CAI field is the sixth code, the processing unit 22 is specifically configured to: for the CAI field, obtain the number of the preceding scheduled carrier and the number of the next scheduled carrier according to the sixth code and the fourth mapping relationship.

It should be noted that, for specific working processes of the functional modules of the UE in this embodiment of the present invention, refer to specific descriptions of a corresponding process in a method embodiment, and details are not described in this embodiment of the present invention.

According to the UE provided in this embodiment of the present invention, the UE receives DCI that is sent by a base station by using at least one current scheduled carrier and that carries a CAI field, and obtains the CAI field in the DCI, to learn scheduling statuses of all configured carriers. In the present embodiments, the CAI field received by the UE indicates a total quantity of scheduled carriers in all configured carriers configured by the base station and an accumulative index value of the current scheduled carrier, or indicates a number of a preceding scheduled carrier of the current scheduled carrier and a number of a next scheduled carrier of the current scheduled carrier, that is, the CAI field in the present embodiments indicates scheduling information of a scheduled carrier. However, in the prior art, a DAI2 field that is sent by a base station to UE and that is used to perform carrier scheduling indication indicates a scheduling status of each configured carrier in all configured carriers different from the current scheduled carrier. The total quantity of the scheduled carriers of the base station is less than or equal to a total quantity of the configured carriers of the base station. Therefore, compared with the prior art, when the base station configures a relatively large quantity of carriers, a CAI field generated by the base station according to a method provided in an embodiment of the present invention includes a relatively small quantity of bits. In this way, a length of a DCI field is reduced, and signaling overheads are reduced.

In addition, based on a carrier scheduling indication provided in an embodiment of the present invention, the UE may determine, according to the total quantity of the scheduled carriers of the base station, the quantity of bits of the HARQ information sent to the base station. Because the total quantity of the scheduled carriers of the base station is less than or equal to a total quantity of the configured carriers of the base station, compared with the prior art in which the UE determines, according to the total quantity of all the configured carriers, the quantity of bits of the HARQ information sent to the base station, the quantity of bits of the HARQ information is reduced and signaling overheads are reduced.

Figure 4:
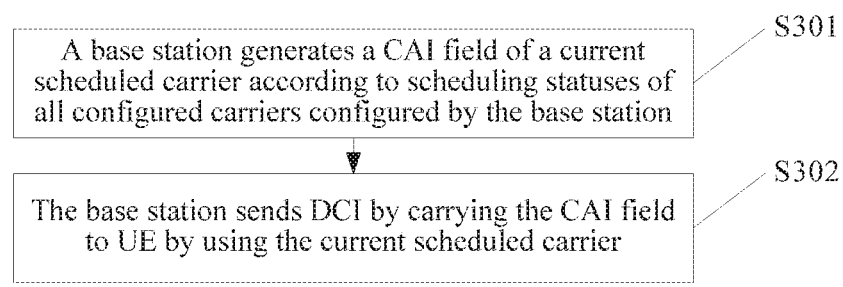
FIG. 4 is a flowchart of a carrier scheduling indication method according to another embodiment of the present invention.

Another embodiment of the present invention provides a carrier scheduling indication method. As shown in FIG. 4, the method may include.

S301: A base station generates a CAI field of a current scheduled carrier according to scheduling statuses of all configured carriers configured by the base station.

In a possible implementation manner, the CAI field is used to indicate a total quantity of scheduled carriers in all the configured carriers and an accumulative index value M of the current scheduled carrier, M represents that the current scheduled carrier is the $M^{th}$ scheduled carrier from the first configured carrier to the current scheduled carrier, and M is an integer greater than or equal to 1. Exemplarily, when the accumulative index value of the current scheduled carrier is 5, it indicates that the current scheduled carrier is the fifth scheduled carrier starting from the first configured carrier.

In another possible implementation manner, the CAI field is used to indicate a number of a preceding scheduled carrier of the current scheduled carrier and a number of a next scheduled carrier of the current scheduled carrier.

S302: The base station adds the CAI field to DCI and sends the DCI to UE by using the current scheduled carrier.

After generating the CAI field of the current scheduled carrier according to the scheduling statuses of all the configured carriers configured by the base station, the base station adds the generated CAI field to the DCI and sends the DCI to the UE by using the current scheduled carrier.

According to the carrier scheduling indication method provided in this embodiment of the present invention, after generating a CAI field of a current scheduled carrier according to scheduling statuses of all configured carriers configured by a base station, the base station adds the generated CAI field to DCI and sends the DCI to UE by using the current scheduled carrier. In the present embodiments, the CAI field that is sent by the base station to the UE and that is used to perform carrier scheduling indication indicates a total quantity of all scheduled carriers and an accumulative index value of the current scheduled carrier, or indicates a number of a preceding scheduled carrier of the current scheduled carrier and a number of a next scheduled carrier of the current scheduled carrier, that is, the CAI field in the present embodiments indicates scheduling information of a scheduled carrier. However, in the prior art, a DAI2 field that is sent by a base station to UE and that is used to perform carrier scheduling indication indicates a scheduling status of each configured carrier in all configured carriers different from the current scheduled carrier. The total quantity of the scheduled carriers of the base station is less than or equal to a total quantity of the configured carriers of the base station. Therefore, compared with the prior art, when the base station configures a relatively large quantity of carriers, the CAI field generated by the base station according to the method provided in this embodiment of the present embodiments includes a relatively small quantity of bits. In this way, a length of a DCI field is reduced, and signaling overheads are reduced.

Further, in S301, when the CAI field of the current scheduled carrier that is generated by the base station is used to indicate the total quantity of the scheduled carriers in all the configured carrier and the accumulative index value M of the current scheduled carrier, in a first possible implementation manner, a specific process of generating the CAI field is (that is, S301 may be specifically) obtaining, by the base station, the total quantity of the scheduled carriers in all the configured carriers, obtaining the accumulative index value M of the current scheduled carrier, obtaining a first code according to the total quantity of the scheduled carriers and a first preset mapping relationship, obtaining a second code according to the accumulative index M of the current scheduled carrier and a second preset mapping relationship, and combining the first code and the second code to generate the CAI field. The first mapping relationship is used to indicate the first code corresponding to the total quantity of the scheduled carriers, and the second mapping relationship is used to indicate the second code corresponding to the accumulative index M of the current scheduled carrier.

Exemplarily, the first code may be obtained after binary coding is performed on the total quantity of the scheduled carriers in all the configured carriers. Similarly, the second code may be obtained after binary coding is performed on the accumulative index value M of the current scheduled carrier.

A quantity of bits of the CAI field that is generated by the base station according to the first code and the second code is $2\lceil \log_2 N \rceil$, N is the total quantity of all the configured carriers, and $\lceil \log_2 N \rceil$ represents a value obtained after $\log_2 N$ is rounded up. In a possible implementation manner, the first code obtained by the base station is located at first $\lceil \log_2 N \rceil$ bits of the CAI field, and the obtained second code is located at last $\lceil \log_2 N \rceil$ bits of the CAI field. In another possible implementation manner, the first code obtained by the base station is located at last $\lceil \log_2 N \rceil$ bits of the CAI field, and the obtained second code is located at first $\lceil \log_2 N \rceil$ bits of the CAI field.

Further, to reduce a length of the CAI field as much as possible when a quantity of configured carriers of the base station is relatively large, in a second possible implementation manner, before the base station obtains the first code according to the total quantity of the scheduled carriers and the first preset mapping relationship, and obtains the second code according to the accumulative index M of the current scheduled carrier and the second preset mapping relationship, the base station may first determine whether $\lceil \log_2 N \rceil$ is greater than 2; if the base station determines that $\lceil \log_2 N \rceil$ is not greater than 2, after obtaining the total quantity of the scheduled carriers in all the configured carriers and obtaining the accumulative index value M of the current scheduled carrier, the base station obtains the first code according to the total quantity of the scheduled carriers and the first preset mapping relationship, obtains the second code according to the accumulative index M of the current scheduled carrier and the second preset mapping relationship, and combines the first code and the second code to generate the CAI field; if the base station determines that $\lceil \log_2 N \rceil$ is greater than 2, after obtaining the total quantity of the scheduled carriers in all the configured carriers and obtaining the accumulative index value M of the current scheduled carrier, the base station obtains the first code according to the total quantity of the scheduled carriers and the first preset mapping relationship, obtains a third code according to the accumulative index M of the current scheduled carrier and a third preset mapping relationship, and combines the first code and the third code to generate the CAI field. The third mapping relationship is used to indicate the third code corresponding to the accumulative index M of the current scheduled carrier, and a quantity of bits of the third code is less than a quantity of bits of the second code.

Optionally, a quantity of bits of the CAI field generated by the base station by combining the first code and the second code is $\lceil \log_2 N \rceil + a$, where a is an integer greater than or equal to 2 and less than $\lceil \log_2 N \rceil$. Preferably, the quantity of bits of the CAI field may be $\lceil \log_2 N \rceil + 2$. In a possible implementation manner, the first code obtained by the base station is located at first $\lceil \log_2 N \rceil$ bits of the CAI field, and the obtained third code is located at last a bits of the CAI field. In another possible implementation manner, the first code obtained by the base station is located at last $\lceil \log_2 N \rceil$ bits of the CAI field, and the obtained third code is located at first a bits of the CAI field. For a specific coding scheme of the third code, refer to an implementation manner of the present embodiments described in FIG. 7 in the following specification.

Further, when the CAI field of the current scheduled carrier that is generated by the base station is used to indicate the number of the preceding scheduled carrier of the current scheduled carrier and the number of the next scheduled carrier of the current scheduled carrier, a specific process of generating the CAI field, that is, S301, may be specifically: obtaining, by the base station, the number of the preceding scheduled carrier of the current scheduled carrier and the number of the next scheduled carrier of the current scheduled carrier, and generating the CAI field according to the number of the preceding scheduled carrier, the number of the next scheduled carrier, and a fourth preset mapping relationship.

Further, in a first possible implementation manner, the fourth mapping relationship is used to indicate a fourth code corresponding to the number of the preceding scheduled carrier and a fifth code corresponding to the number of the next scheduled carrier. That is, the base station may separately code the number of the preceding scheduled carrier and the number of the next scheduled carrier to obtain the CAI field of the current scheduled carrier. In this way, a specific process of generating, by the base station, the CAI field according to the number of the preceding scheduled carrier, the number of the next scheduled carrier, and the fourth preset mapping relationship may be: obtaining, by the base station, the fourth code according to the number of the preceding scheduled carrier and the fourth mapping relationship, obtaining the fifth code according to the number of the next scheduled carrier and the fourth mapping relationship, and combining the obtained fourth code and fifth code to generate the CAI field.

Exemplarily, the fourth code may be obtained after binary coding is performed on the number of the preceding scheduled carrier. Similarly, the fifth code may be obtained after binary coding is performed on the number of the next scheduled carrier.

The quantity of bits of the CAI field may be $2\lceil \log_2 N \rceil$. In a possible implementation manner, the fourth code obtained by the base station is located at first $\lceil \log_2 N \rceil$ bits of the CAI field, and the fifth code is located at last $\lceil \log_2 N \rceil$ bits of the CAI field. In another possible implementation manner, the fourth code obtained by the base station is located at last $\lceil \log_2 N \rceil$ bits of the CAI field, and the fifth code is located at first $\lceil \log_2 N \rceil$ bits of the CAI field.

Further, to reduce the length of the CAI field as much as possible when a quantity of configured carriers of the base station is relatively large, in a second possible implementation manner, the fourth mapping relationship is used to indicate a sixth code obtained after joint coding is performed on the number of the preceding scheduled carrier and the number of the next scheduled carrier, and a quantity of bits of the sixth code is less than a sum of a quantity of bits of the fourth code and a quantity of bits of the fifth code. That is, the base station may perform joint coding on the number of the preceding scheduled carrier and the number of the next scheduled carrier to obtain the CAI field of the current scheduled carrier. In this way, a specific process of generating, by the base station, the CAI field according to the number of the preceding scheduled carrier, the number of the next scheduled carrier, and the fourth preset mapping relationship may be: obtaining, by the base station, the sixth code according to the number of the preceding scheduled carrier, the number of the next scheduled carrier, and the fourth mapping relationship, and using the sixth code as the CAI field.

In this case, the quantity of bits of the CAI field may be $\lceil \log_2(C_N^2+1) \rceil$. For a specific coding scheme of the sixth code, refer to an implementation manner of the present embodiments described in FIG. 9 in the following specification.

Figure 5:
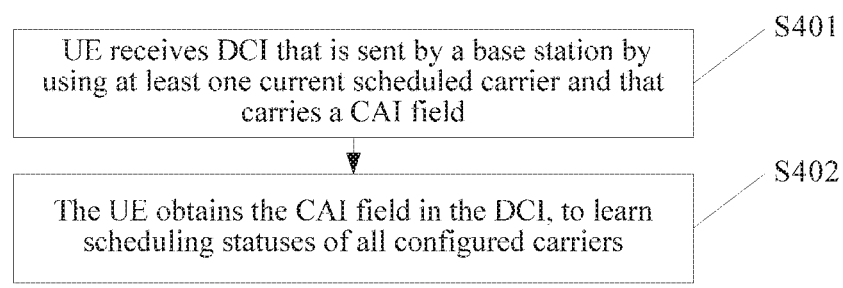
FIG. 5 is a flowchart of a carrier scheduling indication method according to another embodiment of the present invention.

Another embodiment of the present invention provides a carrier scheduling indication method. As shown in FIG. 5, the method may include.

S401: UE receives DCI that is sent by a base station by using at least one current scheduled carrier and that carries a CAI field.

In a possible implementation manner, the CAI field is used to indicate a total quantity of scheduled carriers in all configured carriers configured by the base station and an accumulative index value M of the current scheduled carrier, M represents that the current scheduled carrier is the $M^{th}$ scheduled carrier from the first configured carrier to the current scheduled carrier, and M is an integer greater than or equal to 1. In another possible implementation manner, the CAI field is used to indicate a number of a preceding scheduled carrier of the current scheduled carrier and a number of a next scheduled carrier of the current scheduled carrier.

S402: The UE obtains the CAI field in the DCI, to learn scheduling statuses of all configured carriers.

After receiving the DCI that is sent by the base station by using the at least one current scheduled carrier and that carries the CAI field, the UE may obtain CAI fields in all received DCI, to learn the scheduling statuses of all the configured carriers configured by the base station.

According to the carrier scheduling indication method provided in this embodiment of the present invention, UE receives DCI that is sent by a base station by using at least one current scheduled carrier and that carries a CAI field, and obtains the CAI field in the DCI, to learn scheduling statuses of all configured carriers. In the present embodiments, the CAI field received by the UE indicates a total quantity of scheduled carriers in all configured carriers configured by the base station and an accumulative index value of the current scheduled carrier, or indicates a number of a preceding scheduled carrier of the current scheduled carrier and a number of a next scheduled carrier of the current scheduled carrier, that is, the CAI field in the present embodiments indicates scheduling information of a scheduled carrier. However, in the prior art, a DAI2 field that is sent by a base station to UE and that is used to perform carrier scheduling indication indicates a scheduling status of each configured carrier in all configured carriers different from the current scheduled carrier. The total quantity of the scheduled carriers of the base station is less than or equal to a total quantity of the configured carriers of the base station. Therefore, compared with the prior art, when the base station configures a relatively large quantity of carriers, a CAI field generated by the base station according to the method provided in this embodiment of the present invention includes a relatively small quantity of bits. In this way, a length of a DCI field is reduced, and signaling overheads are reduced.

After obtaining the CAI field in the DCI and learning the scheduling statuses of all the configured carriers, the UE may receive data according to the CAI field in the DCI. To ensure reliability of data transmission, the UE may send HARQ information to the base station, to feedback whether the UE correctly receives data that is sent by the base station by using all the scheduled carriers. Therefore, further, after S402 is performed, that is, after the UE obtains the CM field in the DCI, the UE may send the HARQ information to the base station.

The HARQ information is used to feedback whether the UE correctly receives data that is sent by the base station by using all the scheduled carriers, and a quantity of bits of the HARQ information is equal to a sum of quantities of bits that are needed to feedback whether the data sent by using all the scheduled carriers is correctly received.

Further, when the CAI field carried in the DCI received by the UE in S401 is used to indicate the total quantity of the scheduled carriers in all the configured carriers configured by the base station and the accumulative index value M of the current scheduled carrier, in a first possible implementation manner, the CAI field carried in the DCI received by the UE includes a first code and a second code.

The first code is a code obtained by the base station according to the total quantity of the scheduled carriers and a first preset mapping relationship, and the first mapping relationship is used to indicate the first code corresponding to the total quantity of the scheduled carriers. The second code is a code obtained by the base station according to M and a second preset mapping relationship, and the second mapping relationship is used to indicate the second code corresponding to M.

Exemplarily, the first code may be obtained after binary coding is performed on the total quantity of the scheduled carriers in all the configured carriers. Similarly, the second code may be obtained after binary coding is performed on the accumulative index value M of the current scheduled carrier.

In a second possible implementation manner, the CAI field carried in the DCI received by the UE includes a first code and a third code.

The first code is a code obtained by the base station according to the total quantity of the scheduled carriers and a first preset mapping relationship, and the first mapping relationship is used to indicate the first code corresponding to the total quantity of the scheduled carriers. The third code is a code obtained by the base station according to M and a third preset mapping relationship, and the third mapping relationship is used to indicate the third code corresponding to M. A quantity of bits of the third code is less than a quantity of bits of a second code.

Further, when the CAI field carried in the DCI received by the UE in S401 is used to indicate the number of the preceding scheduled carrier of the current scheduled carrier and the number of the next scheduled carrier of the current scheduled carrier, in a first possible implementation manner, the CAI field carried in the DCI received by the UE includes a fourth code and a fifth code.

The fourth code is a code obtained by the base station according to the number of the preceding scheduled carrier and a fourth preset mapping relationship, the fifth code is a code obtained by the base station according to the number of the next scheduled carrier and the fourth mapping relationship, and the fourth mapping relationship is used to indicate the fourth code corresponding to the number of the preceding scheduled carrier and the fifth code corresponding to the number of the next scheduled carrier.

Exemplarily, the fourth code may be obtained after binary coding is performed on the number of the preceding scheduled carrier. Similarly, the fifth code may be obtained after binary coding is performed on the number of the next scheduled carrier.

In a second possible implementation manner, the CAI field carried in the DCI received by the UE is a sixth code.

The sixth code is a code obtained by the base station according to the number of the preceding scheduled carrier, the number of the next scheduled carrier, and a fourth preset mapping relationship, and the fourth mapping relationship is used to indicate the sixth code that is obtained after joint coding is performed on the number of the preceding scheduled carrier and the number of the next scheduled carrier.

In this case, a quantity of bits of the CAI field may be $\lceil \log_2(C_N^2+1) \rceil$. For a specific coding scheme of the sixth code, refer to an implementation manner of the present embodiments described in FIG. 9 in the following specification.

Further, in a possible implementation manner, when the CAI field carried in the DCI received by the UE in S401 is used to indicate the total quantity of the scheduled carriers in all the configured carriers configured by the base station and the accumulative index value M of the current scheduled carrier, the sending, by the UE, HARQ information to the base station may be specifically: determining, by the UE, the total quantity of the scheduled carriers and an accumulative index value M of at least one current scheduled carrier according to the CAI field, and sending the HARQ information to the base station according to the total quantity of the scheduled carriers and the accumulative index value M of the at least one current scheduled carrier.

When the CAI field includes the first code and the second code, the determining, by the UE, the total quantity of the scheduled carriers and an accumulative index value M of at least one current scheduled carrier according to the CAI field may be specifically: for each CAI field, obtaining, by the UE, the total quantity of the scheduled carriers according to the first mapping relationship and the first code, and obtaining M according to the second mapping relationship and the second code. When the CAI field includes the first code and the third code, the determining, by the UE, the total quantity of the scheduled carriers and an accumulative index value M of at least one current scheduled carrier according to the CAI field may be specifically: for each CAI field, obtaining the total quantity of the scheduled carriers according to the first mapping relationship and the first code, and obtaining M according to the third mapping relationship and the third code.

In another possible implementation manner, when the CAI field is used to indicate the number of the preceding scheduled carrier of the current scheduled carrier and the number of the next scheduled carrier of the current scheduled carrier, the sending, by the UE, HARQ information to the base station may be specifically: determining, by the UE, a number of a preceding scheduled carrier of at least one current scheduled carrier and a number of a next scheduled carrier of the at least one current scheduled carrier according to the CAI field, determining the total quantity of the scheduled carriers according to the number of the preceding scheduled carrier of the at least one current scheduled carrier and the number of the next scheduled carrier of the at least one current scheduled carrier, and sending the HARQ information to the base station according to the total quantity of the scheduled carriers, the number of the preceding scheduled carrier of the at least one current scheduled carrier, and the number of the next scheduled carrier of the at least one current scheduled carrier.

When the CAI field includes the fourth code and the fifth code, the determining, by the UE, a number of a preceding scheduled carrier of at least one current scheduled carrier and a number of a next scheduled carrier of the at least one current scheduled carrier according to the CAI field may be specifically: for each CAI field, obtaining, by the UE, the number of the preceding scheduled carrier according to the fourth code and the fourth mapping relationship, and obtaining the number of the next scheduled carrier according to the fifth code and the fourth mapping relationship. When the CAI field is the sixth code, the determining, by the UE, a number of a preceding scheduled carrier of at least one current scheduled carrier and a number of a next scheduled carrier of the at least one current scheduled carrier according to the CAI field may be specifically: for each CAI field, obtaining, by the UE, the number of the preceding scheduled carrier and the number of the next scheduled carrier according to the sixth code and the fourth mapping relationship.

Optionally, the quantity of bits of the HARQ information in the present embodiments is equal to a sum of quantities of bits that are needed to feedback whether data sent by using all the scheduled carriers is correctly received, that is, the quantity of bits of the HARQ information in the present embodiments is determined based on the total quantity of the scheduled carriers. In the prior art, the quantity of bits of the HARQ information sent by the UE to a base station is determined based on a total quantity of configured carriers. Because the total quantity of the scheduled carriers of the base station is less than or equal to the total quantity of the scheduled carriers of the base station, based on the carrier scheduling indication provided in this embodiment of the present embodiments, the UE may determine, according to the total quantity of the scheduled carriers of the base station, the quantity of bits of the HARQ information sent to the base station, and the determined quantity of bits of the HARQ information is less than the quantity, which is determined according to the total quantity of the configured carriers of the base station, of bits of the HARQ information sent to the base station. In this way, feedback overheads of the UE are reduced.

Another embodiment of the present embodiments provides a carrier scheduling indication method. In order that UE can learn carrier scheduling performed by a base station, the base station may add a CAI field to DCI sent to the UE, so that the UE learns, according to CAI fields carried in all received DCI, carrier scheduling performed by the base station. For the convenience of understanding by a person skilled in the art, in this embodiment of the present invention, except a fourth implementation manner, a specific implementation process of the present embodiments is described in detail with reference to different implementation manners and by using an example in which a total quantity of all configured carriers of the base station is equal to 16, and the base station schedules carriers CC0, CC2, and CC5. Details are as follows.

Figure 6:
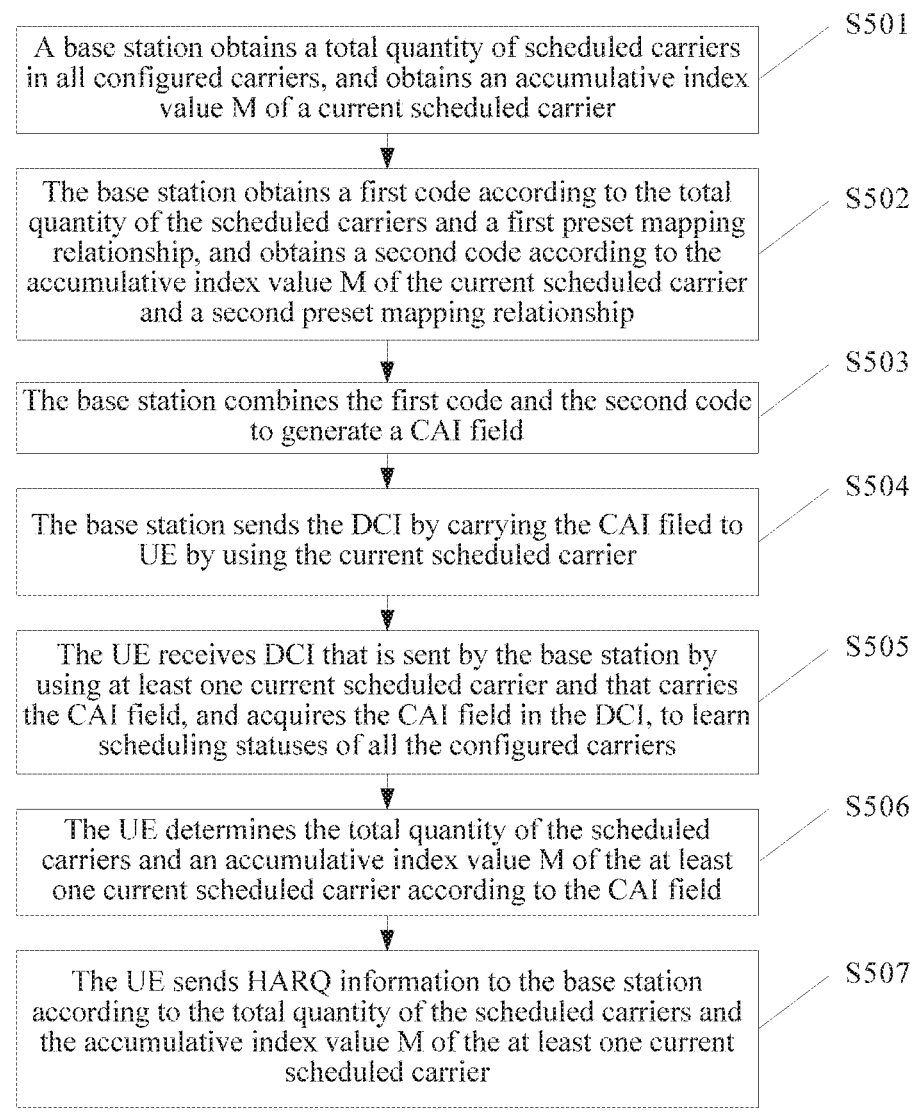
FIG. 6 is a flowchart of a carrier scheduling indication method according to another embodiment of the present invention.

In a first implementation manner, as shown in FIG. 6, the method may include.

S501: A base station obtains a total quantity of scheduled carriers in all configured carriers, and obtains an accumulative index value M of a current scheduled carrier.

M represents that the current scheduled carrier is the $M^{th}$ scheduled carrier from the first configured carrier to the current scheduled carrier. Exemplarily, carriers scheduled by the base station are CC0, CC2, and CC5. Therefore, the base station obtains the total quantity 3 of the scheduled carriers, an accumulative index value of the current scheduled carrier CC0 is 1, an accumulative index value of the current scheduled carrier CC2 is 2, and an accumulative index value of the current scheduled carrier CC5 is 3.

S502: The base station obtains a first code according to the total quantity of the scheduled carriers and a first preset mapping relationship, and obtains a second code according to the accumulative index value M of the current scheduled carrier and a second preset mapping relationship.

The first mapping relationship is used to indicate the first code corresponding to the total quantity of the scheduled carriers, and the second mapping relationship is used to indicate the second code corresponding to M.

Exemplarily, when a quantity of the configured carriers of the base station is equal to 16, the first preset mapping relationship in the base station may be shown in Table 1, and the second preset mapping relationship may be shown in Table 2. For CC0, the base station searches Table 1 according to the obtained total quantity of the scheduled carriers (the total quantity of the scheduled carriers is equal to 3), to obtain a first code 0010, and searches Table 2 according to the obtained accumulative index value of the current scheduled carrier CC0 (the accumulative index value of CC0 is equal to 1), to obtain a second code 0000. For CC2, the base station obtains the first code 0010, and searches Table 2 according to the obtained accumulative index value of the current scheduled carrier CC2 (the accumulative index value of CC0 is equal to 2), to obtain a second code 0001. For CC5, the base station obtains the first code 0010, and searches Table 2 according to the obtained accumulative index value of the current scheduled carrier CC5 (the accumulative index value of CC0 is equal to 3), to obtain a second code 0010.

It should be noted that, in this embodiment of the present invention, for each current scheduled carrier, the base station may obtain the first code only once, and obtain a second code of each current scheduled carrier.

TABLE 1

| Total quantity of scheduled carriers | First code |
|---|---|
| 1 | 0000 |
| 2 | 0001 |
| 3 | 0010 |
| 4 | 0011 |
| 5 | 0100 |
| 6 | 0101 |
| 7 | 0110 |
| 8 | 0111 |
| 9 | 1000 |
| 10 | 1001 |
| 11 | 1010 |
| 12 | 1011 |
| 13 | 1100 |
| 14 | 1101 |
| 15 | 1110 |
| 16 | 1111 |

TABLE 2

| Accumulative index value of a current scheduled carrier | Second code |
|---|---|
| 1 | 0000 |
| 2 | 0001 |
| 3 | 0010 |
| 4 | 0011 |
| 5 | 0100 |
| 6 | 0101 |
| 7 | 0110 |
| 8 | 0111 |
| 9 | 1000 |
| 10 | 1001 |
| 11 | 1010 |
| 12 | 1011 |
| 13 | 1100 |
| 14 | 1101 |
| 15 | 1110 |
| 16 | 1111 |

It should be noted that, values included in Table 1 and Table 2 in this embodiment of the present invention are only exemplary. This embodiment of the present invention does not limit a specific value, that is, a coding scheme, of the first code corresponding to the total quantity of the scheduled carriers in Table 1, or limit a specific value, that is, a coding scheme, of the second code corresponding to the accumulative index value of the current scheduled carrier in Table 2. The specific value of the first code corresponding to the total quantity of the scheduled carriers and the specific value of the second code corresponding to the accumulative index value of the current scheduled carrier may be set correspondingly according to needs of an actual scenario.

S503: The base station combines the first code and the second code to generate a CAI field.

The CAI field is used to indicate the total quantity of the scheduled carriers in all the configured carriers and the accumulative index value of the current scheduled carrier. According to the example in S502, because the total quantity of all the configured carriers of the base station is equal to 16, and a quantity of bits of the CAI field may be $2\lceil \log_2 N \rceil$, the CAI field generated by the base station has eight bits. In addition, in the generated CAI field, in a first possible implementation manner, the first code is located at first four bits of the CAI field, and the second code is located at last four bits of the CAI field; in a second possible implementation manner, the first code is located at last four bits of the CAI field, and the second code is located at first four bits of the CAI field.

Exemplarily, for CC0, a CAI field of CC0 that is generated by the base station in the first possible implementation manner is 00100000, and a CAI field of CC0 that is generated by the base station in the second possible implementation manner is 00000010. For CC2, a CAI field of CC2 that is generated by the base station in the first possible implementation manner is 00100001, and a CAI field of CC2 that is generated by the base station in the second possible implementation manner is 00010010. For CC5, a CAI field of CC5 that is generated by the base station in the first possible implementation manner is 00100010, and a CAI field of CC5 that is generated by the base station in the second possible implementation manner is 00100010.

S504: The base station adds the CAI field to DCI and sends the DCI to UE by using the current scheduled carrier.

The base station may add the generated CAI field of CC0 to DCI and send the DCI to the UE by using CC0, may add the generated CAI field of CC2 to DCI and send the DCI to the UE by using CC2, and may add the generated CAI field of CC5 to DCI and send the DCI to the UE by using CC5.

S505: The UE receives DCI that is sent by the base station by using at least one current scheduled carrier and that carries the CAI field, and obtains the CAI field in the DCI, to learn scheduling statuses of all the configured carriers.

The CAI field is used to indicate the total quantity of the scheduled carriers in all the configured carriers configured by the base station and the accumulative index value M of the current scheduled carrier, and includes the first code and the second code. According to the example in this embodiment of the present invention, in a possible implementation manner, the first four bits of the CAI field are the first code and the last four bits of the CAI field are the second code. In another possible implementation manner, the first four bits of the CAI field are the second code and the last four bits of the CAI field are the first code.

The UE receives, by using CC0, CC2, and CC5, the DCI sent by the base station, and obtains the CAI field in each piece of DCI, to learn the scheduling statuses of all the configured carriers with reference to information in each CAI field. Thereafter, the UE may receive data according to the DCI. Optionally, to ensure reliability of data transmission, the UE may send HARQ information to the base station, to feedback whether the UE correctly receives data that is sent by the base station by using all the scheduled carriers. Therefore, after S505, the method may further include S506 and S507.

S506: The UE determines the total quantity of the scheduled carriers and an accumulative index value M of the at least one current scheduled carrier according to the CAI field.

S506 may be specifically: for each obtained CAI field, obtaining, by the UE, the total quantity of the scheduled carriers according to the first mapping relationship and the first code, and obtaining M according to the second mapping relationship and the second code.

Exemplarily, when the first preset mapping relationship in the base station is shown in Table 1, the first preset mapping relationship in the UE is also shown in Table 1; when the second preset mapping relationship in the base station is shown in Table 2, the second preset mapping relationship in the UE is also shown in Table 2. When the first four bits of the CAI field are the first code and the last four bits of the CAI field are the second code, if the UE receives the DCI by using CC0, and the CAI field carried in the DCI is 00100000, the UE searches Table 1 according to the first code 0010, to obtain the total quantity 3 of the scheduled carriers, and searches Table 2 according to the second code 0000, to obtain the accumulative index value 1 of the current scheduled carrier CC0. Similarly, if the UE receives the DCI by using CC2, and the CAI field carried in the DCI is 00100001, the UE may obtain the total quantity 3 of the scheduled carriers, and obtain the accumulative index value 2 of the current scheduled carrier CC5; if the UE receives the DCI by using CC5, and the CAI field carried in the DCI is 00100010, the UE may obtain the total quantity 3 of the scheduled carriers, and obtain the accumulative index value 3 of the current scheduled carrier CC5.

S507: The UE sends HARQ information to the base station according to the total quantity of the scheduled carriers and the accumulative index value M of the at least one current scheduled carrier.

A quantity of bits of the HARQ information may be equal to a sum of quantities of bits that are needed to feedback whether data sent by using all the scheduled carriers is correctly received.

After learning the total quantity of the scheduled carriers and the accumulative index value M of the at least one current scheduled carrier, the UE may learn the scheduling statuses of all the configured carriers with reference to the information in each CAI field. In this way, the UE can send the HARQ information with reference to an actual status of receiving data that is sent by using each scheduled carrier.

It should be noted that, in this embodiment of the present invention, the UE may send the HARQ information to the base station by using a primary carrier, or may send the HARQ information to the base station by using a primary carrier and one secondary carrier. In this embodiment of the present invention, no specific limitation is imposed on a carrier used to send the HARQ information. A specific carrier used to send the HARQ information may be selected according to needs of an actual application scenario.

Exemplarily, when one bit is needed to feedback whether data sent by using each scheduled carrier is correctly received, using an example in which "1" represents that the UE correctly receives the data, and "0" represents that the UE does not correctly receive the data, when the UE receives the DCI separately by using CC0 and CC5, the UE may learn that the base station transmits data separately by using CC0 and CC5, and may learn that a total quantity of scheduled carriers of the base station is equal to 3, an accumulative index value of CC0 is 1, and an accumulative index value of CC5 is 3; if the UE correctly receives only data that is sent by the base station by using CC0, the HARQ information sent by the UE to the base station is 100, to indicate that the UE already correctly receives data that is sent by the base station by using the current scheduled carrier whose accumulative index value is 1, and does not correctly receive data that is sent by the base station by using scheduled carriers whose accumulative index values are 2 and 3. After receiving the HARQ information sent by the UE, the base station may re-send at least one of the DCI or the data to the UE by using the scheduled carriers whose accumulative index values are 2 and 3.

As can be seen from the foregoing, when one bit is needed to feedback whether data sent by using each scheduled carrier is correctly received, a quantity of bits of the HARQ information is equal to the total quantity of the scheduled carriers of the base station; however, in the prior art, a quantity of bits of HARQ information sent by UE to a base station is equal to the total quantity of configured carriers of the base station. Because the total quantity of the scheduled carriers of the base station is less than or equal to the total quantity of the scheduled carriers of the base station, based on the carrier scheduling indication provided in this embodiment of the present invention, the UE may determine, according to the total quantity of the scheduled carriers of the base station, the quantity of bits of the HARQ information sent to the base station, and the determined total quantity of bits of the HARQ information is less than a quantity, which is determined according to the total quantity of the configured carriers of the base station in the prior art, of bits of the HARQ information sent to the base station. In this way, feedback overheads of the UE are reduced.

Further, when a time division duplexing (TDD for short) mode is used to transmit data between the base station and the UE, the UE may send the HARQ information to the base station only by using a physical uplink control channel format 3 (PUCCH format 3 for short), but a maximum quantity of feedback bits supported by the PUCCH format 3 is 20. In this way, when the base station configures a relatively large quantity of carriers (that is, a total quantity of configured carriers is relatively large), if the method for determining, according to a total quantity of configured carriers of a base station, HARQ information sent to the base station in the prior art is used, a quantity of bits of the fed-back HARQ information is greater than 20, leading to a failure in sending the HARQ information. However, if the UE sends the HARQ information to the base station according to the carrier scheduling indication method provided in the present embodiments, a probability that a quantity, which is determined by the UE according to the total quantity of the scheduled carriers of the base station, of bits of the HARQ information sent to the base station is greater than 20 is greatly reduced. Therefore, the UE may send the HARQ information to the base station by using the PUCCH format 3.

Figure 7:
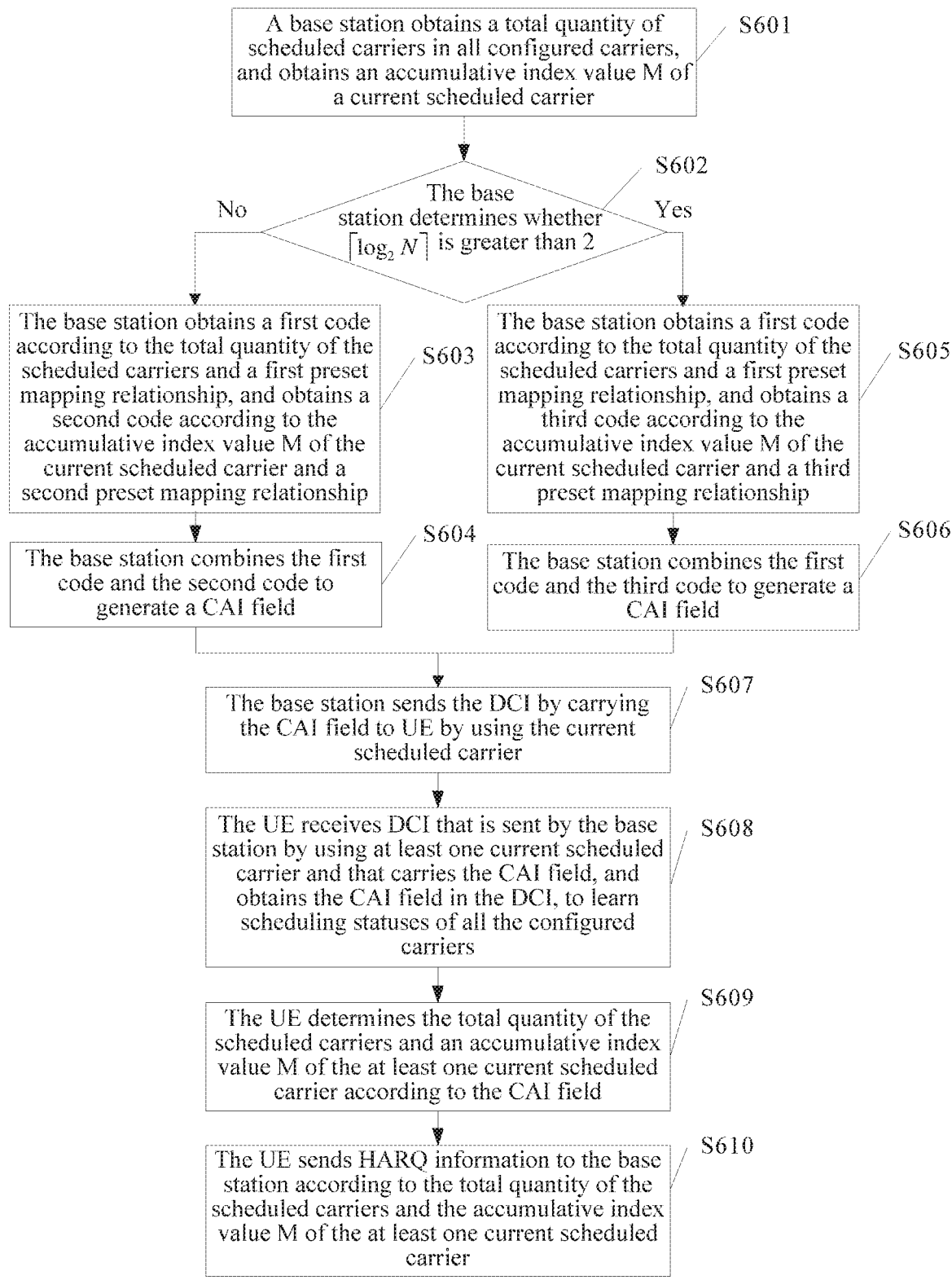
FIG. 7 is a flowchart of another carrier scheduling indication method according to another embodiment of the present invention.

In a second implementation manner, as shown in FIG. 7, the method may include.

S601: A base station obtains a total quantity of scheduled carriers in all configured carriers, and obtains an accumulative index value M of a current scheduled carrier.

S602: The base station determines whether $\lceil \log_2 N \rceil$ is greater than 2.

After obtaining the total quantity of the scheduled carriers and the accumulative index value M of the current scheduled carrier, to reduce a quantity of bits of a CAI field as much as possible when a quantity of configured carriers of the base station is relatively large, the base station may first determine whether $\lceil \log_2 N \rceil$ is greater than 2; when determining that $\lceil \log_2 N \rceil$ is not greater than 2, perform S603 and S604; when determining that $\lceil \log_2 N \rceil$ is greater than 2, perform S605 and S606. It is assumed that the total quantity N of the configured carriers of the base station is equal to 16. Based on this, the base station may determine that $\lceil \log_2 N \rceil$ is greater than 2, that is, after performing S602, the base station continues to perform S605 and S606.

S603: The base station obtains a first code according to the total quantity of the scheduled carriers and a first preset mapping relationship, and obtains a second code according to the accumulative index value M of the current scheduled carrier and a second preset mapping relationship.

The first mapping relationship is used to indicate the first code corresponding to the total quantity of the scheduled carriers, and the second mapping relationship is used to indicate the second code corresponding to M.

Either of quantities of bits of the first code and the second code may be $\lceil \log_2 N \rceil$.

S604: The base station combines the first code and the second code to generate a CAI field.

S605: The base station obtains a first code according to the total quantity of the scheduled carriers and a first preset mapping relationship, and obtains a third code according to the accumulative index value M of the current scheduled carrier and a third preset mapping relationship.

The third mapping relationship is used to indicate the third code corresponding to the accumulative index value M of the current scheduled carrier, and a quantity of bits of the third code is less than a quantity of bits of the second code. In the third mapping relationship, because multiple different Ms may correspond to one third code, the quantity of bits of the third code may be less than the quantity of bits of the second code, that is, the quantity of bits of the third code is less than $\lceil \log_2 N \rceil$.

Exemplarily, when the quantity of the configured carriers of the base station is equal to 16, to reduce a quantity of bits of a CAI field as much as possible when a quantity of configured carriers of the base station is relatively large, the quantity of bits of the third code may be less than $\lceil \log_2 N \rceil$, that is, the quantity of bits of the third code may be 2 or 3. Using an example in which the quantity of bits of the third code is 2, the third preset mapping relationship in the base station may be shown in Table 3. As can be seen from Table 3, when M is equal to 1, 5, 9, or 13 separately, the corresponding third code is 00, that is, the quantity of bits of the third code is 2. For CC0, the base station searches Table 1 according to the obtained total quantity of the scheduled carriers (for example, the total quantity of the scheduled carriers is equal to 3), to obtain a first code 0010, and searches Table 3 according to the obtained accumulative index value of the current scheduled carrier CC0 (the accumulative index value of CC0 is equal to 1), to obtain a third code 00; for CC2, the base station obtains the first code 0010, and searches Table 3 according to the accumulative index value of the current scheduled carrier CC2 (the accumulative index value of CC2 is equal to 2), to obtain a third code 01; for CC5, the base station obtains the first code 0010, and searches Table 3 according to the obtained accumulative index value of the current scheduled carrier CC5 (the accumulative index value of CC5 is equal to 3), to obtain a third code 10.

It should be noted that, in this embodiment of the present invention, for each current scheduled carrier, the base station may obtain the first code only once, and obtain a second code of each current scheduled carrier.

TABLE 3

| Accumulative index value of a current scheduled carrier | Third code |
| --- | --- |
| 1, 5, 9, or 13 | 00 |
| 2, 6, 10, or 14 | 01 |
| 3, 7, 11, or 15 | 10 |
| 4, 8, 12, or 16 | 11 |

It should be noted that, values included in Table 3 of this embodiment of the present invention are only exemplary. This embodiment of the present invention does not limit a specific value of the third code corresponding to the accumulative index value of the current scheduled carrier in Table 3. The specific value of the second code corresponding to the accumulative index value of the current scheduled carrier may be set according to needs of an actual scenario.

S606: The base station combines the first code and the third code to generate a CAI field.

The CAI field is used to indicate the total quantity of the scheduled carriers in all the configured carriers and the accumulative index value of the current scheduled carrier. According to the example in this embodiment of the present invention, because the total quantity of all the configured carriers of the base station is equal to 16, according to that a quantity of bits of the CAI field is $\lceil \log_2 N \rceil + a$ (herein, a=2), it can be known that the quantity of bits of the CAI field generated by the base station is 6. In addition, in the generated CAI field, in a first possible implementation manner, the first code is located at first four bits of the CAI field, and the third code is located at last two bits of the CAI field; in a second possible implementation manner, the first code is located at last four bits of the CAI field, and the third code is located at first two bits of the CAI field.

Exemplarily, for CC0, a CAI field of CC0 that is generated by the base station in the first possible implementation manner is 001000, and a CAI field of CC0 that is generated by the base station in the second possible implementation manner is 000010. For CC2, a CAI field of CC2 that is generated by the base station in the first possible implementation manner is 001001, and a CAI field of CC2 that is generated by the base station in the second possible implementation manner is 010010. For CC5, a CAI field of CC5 that is generated by the base station in the first possible implementation manner is 001010, and a CAI field of CC5 that is generated by the base station in the second possible implementation manner is 100010.

S607: The base station adds the CAI field to DCI and sends the DCI to UE by using the current scheduled carrier.

For descriptions of S601 to S604 and S607, refer to descriptions of S501 to S504, and details are not described herein again.

As can be seen from the descriptions of S502 and S503 in the previous embodiment of the present invention and the descriptions of S605 and S606 in this embodiment of the present invention, when $\lceil \log_2 N \rceil$ is greater than 2, the quantity of bits of the third code that is obtained by the base station according to the third mapping relationship is less than the quantity of bits of the second code that is obtained by the base station according to the second mapping relationship. In this way, the quantity of bits of the CAI field that is generated by the base station by combining the first code and the third code is less than the quantity of bits of the CAI field that is generated by the base station by combining the first code and the second code. That is, when $\lceil \log_2 N \rceil$ is greater than 2, preferably, the base station generates the CAI field according to the first code and the third code. In this way, a length of a DCI field can be reduced, and signaling overheads are reduced.

S608: The UE receives DCI that is sent by the base station by using at least one current scheduled carrier and that carries the CAI field, and obtains the CAI field in the DCI, to learn scheduling statuses of all the configured carriers.

The CAI field is used to indicate the total quantity of the scheduled carriers in all the configured carriers configured by the base station and the accumulative index value M of the current scheduled carrier, and may include the first code and the second code, or may include the first code and the third code.

When the CAI field includes the first code and the second code, according to the example in S605 and S606, in a possible implementation manner, the first four bits of the CAI field are the first code and the last two bits of the CAI field are the second code; in another possible implementation manner, the first two bits of the CAI field are the second code and the last four bits of the CAI field are the first code.

When the CAI field includes the first code and the third code, according to the example in this embodiment of the present invention, in a possible implementation manner, the first four bits of the CAI field are the first code and the last two bits of the CAI field are the third code; in another possible implementation manner, the first two bits of the CAI field are the third code and the last four bits of the CAI field are the first code.

After receiving the DCI sent by the base station, obtaining the CAI field in the DCI, and learning the scheduling statuses of all the configured carriers, the UE may receive data according to the DCI. Optionally, to ensure reliability of data transmission, the UE may send HARQ information to the base station, to feedback whether the UE correctly receives data that is sent by the base station by using all the scheduled carriers. Therefore, after S608, the method further includes S609 and S610.

S609: The UE determines the total quantity of the scheduled carriers and an accumulative index value M of the at least one current scheduled carrier according to the CAI field.

When the CAI field includes the first code and the third code, S609 may be specifically: for each CAI field, obtaining the total quantity of the scheduled carriers according to the first mapping relationship and the first code, and obtaining M according to the third mapping relationship and the third code.

Exemplarily, when the first preset mapping relationship in the base station is shown in Table 1, the first preset mapping relationship in the UE is also shown in Table 1; when the third preset mapping relationship in the base station is shown in Table 3, the third preset mapping relationship in the UE is also shown in Table 3. When the first four bits of the CAI field are the first code and the last two bits of the CAI field are the third code, if the UE receives the DCI by using CC0, and the CAI field carried in the DCI is 001000, the UE searches Table 1 according to the first code 0010, to obtain the total quantity 3 of the scheduled carriers, and searches Table 2 according to the third code 00, to obtain the accumulative index values 1, 5, 9, and 13 corresponding to the third code 00. Because the DCI carrying the CAI field is received by the UE by using the current scheduled carrier CC0, the UE may obtain the accumulative index value 1 of the current scheduled carrier CC0. Similarly, if the UE receives the DCI by using CC2, and the CAI field carried in the DCI is 001001, the UE may obtain the total quantity 3 of the scheduled carriers, and obtain the accumulative index value 2 of the current scheduled carrier CC2; if the UE receives the DCI by using CC5, and the CAI field carried in the DCI is 001010, the UE may obtain the total quantity 3 of the scheduled carriers, and obtain the accumulative index value 3 of the current scheduled carrier CC5.

It should be noted that, when the CAI field includes the first code and the second code, for a process of determining, by the UE, the total quantity of the scheduled carriers and the accumulative index value M of the at least one current scheduled carrier according to the CAI field, refer to specific descriptions of S506 in the foregoing embodiment, and details are not described in this embodiment of the present invention again.

S610: The UE sends HARQ information to the base station according to the total quantity of the scheduled carriers and the accumulative index value M of the at least one current scheduled carrier.

A quantity of bits of the HARQ information is equal to a sum of quantities of bits that are needed to feedback whether data sent by using all the scheduled carriers is correctly received. For descriptions of S610, refer to descriptions of S507, and details are not described herein again.

It should be noted that, for specific descriptions of S601 to S610 in this embodiment of the present invention, refer to descriptions of S501 to S507, and details are not described in this embodiment of the present invention again.

Figure 8:
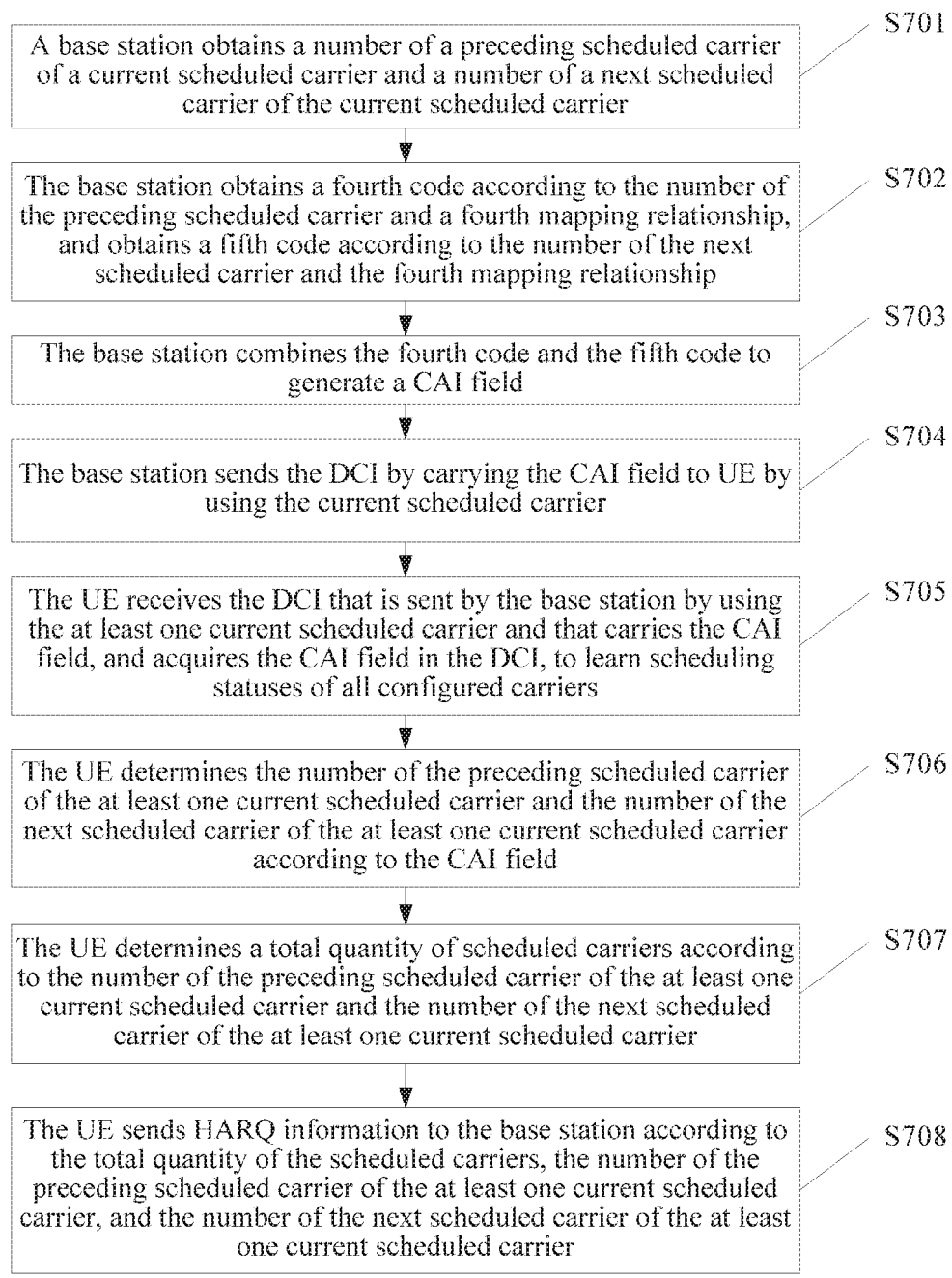
FIG. 8 is a flowchart of another carrier scheduling indication method according to another embodiment of the present invention.

In a third implementation manner, as shown in FIG. 8, the method may include.

S701: A base station obtains a number of a preceding scheduled carrier of a current scheduled carrier and a number of a next scheduled carrier of the current scheduled carrier.

For example, carriers scheduled by the base station are CC0, CC2, and CC5. Therefore, for CC0, a number of a preceding scheduled carrier is 5 and a number of a next scheduled carrier is 2; for CC2, a number of a preceding scheduled carrier is 0 and a number of a next scheduled carrier is 5; for CC5, a number of a preceding scheduled carrier is 2 and a number of a next scheduled carrier is 0.

Exemplarily, when only one carrier in configured carriers of the base station is scheduled, for example, a total quantity of the configured carriers of the base station is 16, and the scheduled carrier is CC5, for CC5, the number of the preceding scheduled carrier is 5 and the number of the next scheduled carrier is 5.

When two carriers in the configured carriers of the base station are scheduled, for example, a total quantity of the configured carriers of the base station is 16, and the scheduled carriers are CC5 and CC8, for CC5, a number of a preceding scheduled carrier is 8 and a number of a next scheduled carrier is 8; and for CC8, a number of a preceding scheduled carrier is 5 and a number of a next scheduled carrier is 5.

S702: The base station obtains a fourth code according to the number of the preceding scheduled carrier and a fourth mapping relationship, and obtains a fifth code according to the number of the next scheduled carrier and the fourth mapping relationship.

The fourth mapping relationship is used to indicate the fourth code corresponding to the number of the preceding scheduled carrier and the fifth code corresponding to the number of the next scheduled carrier.

Exemplarily, the fourth preset mapping relationship may be shown in Table 4. After obtaining the number of the preceding scheduled carrier of the current scheduled carrier and the number of the next scheduled carrier of the current scheduled carrier, the base station may search Table 4 according to the number of the preceding scheduled carrier, to obtain the fourth code, and search Table 4 according to the number of the next scheduled carrier, to obtain the fifth code.

TABLE 4

| Number of a scheduled carrier | Fourth code |
| --- | --- |
| 1 | 0000 |
| 2 | 0001 |
| 3 | 0010 |
| 4 | 0011 |
| 5 | 0100 |
| 6 | 0101 |
| 7 | 0110 |
| 8 | 0111 |
| 9 | 1000 |
| 10 | 1001 |
| 11 | 1010 |
| 12 | 1011 |
| 13 | 1100 |
| 14 | 1101 |
| 15 | 1110 |
| 16 | 1111 |

It should be noted that, values included in Table 4 of this embodiment of the present invention are only exemplary. This embodiment of the present invention does not limit a specific value of codes corresponding to numbers of scheduled carriers in Table 4. Specific values of the code corresponding to the numbers of the scheduled carriers may be set according to needs of an actual scenario.

Certainly, the fourth code may be obtained after binary coding is performed on the number of the preceding scheduled carrier, and the fifth code may be obtained after binary coding is performed on the number of the next scheduled carrier. In this way, after obtaining the number of the preceding scheduled carrier of the current scheduled carrier and the number of the next scheduled carrier of the current scheduled carrier, the base station may directly perform binary coding on the number of the preceding scheduled carrier to obtain the fourth code, and perform binary coding on the number of the next scheduled carrier to obtain the fifth code. Exemplarily, when the quantity of the carriers configured by the base station is equal to 16, a quantity of bits of the preceding scheduled carrier and a quantity of bits of the next scheduled carrier are 4. For example, for the current scheduled carrier CC0, the base station obtains a binary code 0101 of the number 5 of the preceding scheduled carrier of CC0, and obtains a binary code 0010 of the number 2 of the next scheduled carrier; for the current scheduled carrier CC2, the base station obtains a binary code 0000 of the number 0 of the preceding scheduled carrier of CC2, and obtains a binary code 0101 of the number 5 of the next scheduled carrier; for the current scheduled carrier CC5, the base station obtains a binary code 0010 of the number 2 of the preceding scheduled carrier of CC5, and obtains a binary code 0000 of the number 0 of the next scheduled carrier.

S703: The base station combines the fourth code and the fifth code to generate a CAI field.

The CAI field is used to indicate the number of the preceding scheduled carrier of the current scheduled carrier and the number of the next scheduled carrier of the current scheduled carrier. According to the example in this embodiment of the present invention, a total quantity of all configured carriers of the base station is equal to 16, a quantity of bits of the CAI field may be $2\lceil \log_2 N \rceil$, and the quantity of bits of the CAI field generated by the base station is 8. In addition, in the generated CAI field, in a first possible implementation manner, the fourth code is located at first four bits of the CAI field, and the fifth code is located at last four bits of the CAI field; in a second possible implementation manner, the fifth code is located at first four bits of the CAI field, and the fourth code is located at last four bits of the CAI field.

Exemplarily, a CAI field, generated by the base station in the first possible implementation manner, corresponding to each current scheduled carrier may be shown in Table 5, and a CAI field, generated by the base station in the second possible implementation manner, corresponding to each current scheduled carrier may be shown in Table 6.

TABLE 5

| Current scheduled carrier | CAI field | Number of a preceding scheduled carrier | Number of a next scheduled carrier |
|---|---|---|---|
| CC0 | 01010010 | 5 | 2 |
| CC2 | 00000101 | 0 | 5 |
| CC5 | 00100000 | 2 | 0 |

TABLE 6

| Current scheduled carrier | CAI field | Number of a preceding scheduled carrier | Number of a next scheduled carrier |
|---|---|---|---|
| CC0 | 00100101 | 5 | 2 |
| CC2 | 01010000 | 0 | 5 |
| CC5 | 00000010 | 2 | 0 |

S704: The base station adds the CAI field to DCI and sends the DCI to UE by using the current scheduled carrier.

S705: The UE receives the DCI that is sent by the base station by using the at least one current scheduled carrier and that carries the CAI field, and obtains the CAI field in the DCI, to learn scheduling statuses of all configured carriers.

The CAI field is used to indicate the number of the preceding scheduled carrier of the current scheduled carrier and the number of the next scheduled carrier of the current scheduled carrier, and includes the fourth code and the fifth code. According to the example in this embodiment of the present invention, in a possible implementation manner, the first four bits of the CAI field are the fourth code and the last four bits of the CAI field are the fifth code; in another possible implementation manner, the first four bits of the CAI field are the fifth code and the last four bits of the CAI field are the fourth code.

After receiving the DCI sent by the base station, the UE may receive data according to the DCI. Optionally, to ensure reliability of data transmission, the UE may send HARQ information to the base station, to feedback whether the UE correctly receives data that is sent by the base station by using all the scheduled carriers. Therefore, after S705, the method further includes S706 to S708.

S706: The UE determines the number of the preceding scheduled carrier of the at least one current scheduled carrier and the number of the next scheduled carrier of the at least one current scheduled carrier according to the CAI field.

S706 may be specifically: for each CAI field, obtaining, by the UE, the number of the preceding scheduled carrier according to the fourth code and the fourth mapping relationship, and obtaining the number of the next scheduled carrier according to the fifth code and the fourth mapping relationship.

Exemplarily, when the fourth preset mapping relationship in the base station is shown in Table 4, the fourth preset mapping relationship in the UE is also shown in Table 4. When the first four bits of the CAI field are the fourth code and the last four bits of the CAI field are the fifth code, if the UE receives the DCI by using CC0, and the CAI field carried in the DCI is 01010010, the UE may obtain the number 5 of the preceding scheduled carrier of the current scheduled carrier CC0 according to the fourth code, that is, the code 0101 of the first four bits of the CAI field, and may obtain the number 2 of the next scheduled carrier of the current scheduled carrier CC0 according to the fifth code, that is, the code 0010 of the last four bits of the CAI field. Similarly, if the UE receives the DCI by using CC2, and the CAI field carried in the DCI is 00000101, the UE may obtain the number 0 of the preceding scheduled carrier of the current scheduled carrier CC2 according to the fourth code, that is, the code 0000 of the first four bits of the CAI field, and may obtain the number 5 of the next scheduled carrier of the current scheduled carrier CC2 according to the fifth code, that is, the code 0101 of the last four bits of the CAI field. If the UE receives the DCI by using CC5, and the CAI field carried in the DCI is 00100000, the UE may obtain the number 2 of the preceding scheduled carrier of the current scheduled carrier CC5 according to the fourth code, that is, the code 0010 of the first four bits of the CAI field, and may obtain the number 0 of the next scheduled carrier of the current scheduled carrier CC5 according to the fifth code, that is, the code 0000 of the last four bits of the CAI field.

S707: The UE determines a total quantity of scheduled carriers according to the number of the preceding scheduled carrier of the at least one current scheduled carrier and the number of the next scheduled carrier of the at least one current scheduled carrier.

After determining the number of the preceding scheduled carrier of the at least one current scheduled carrier and the number of the next scheduled carrier of the at least one current scheduled carrier according to the CAI field, the UE may determine the total quantity of the scheduled carriers according to the number of the preceding scheduled carrier of the at least one current scheduled carrier and the number of the next scheduled carrier of the at least one current scheduled carrier.

Exemplarily, because the UE obtains the number 5 of the preceding scheduled carrier of CC0 and the number 2 of the next scheduled carrier of CC0, obtains the number 0 of the preceding scheduled carrier of CC2 and the number 5 of the next scheduled carrier of CC2, and obtains the number 2 of the preceding scheduled carrier of CC5 and the number 0 of the next scheduled carrier of CC5, the UE may determine that the scheduled carriers of the base station respectively are CC0, CC2, and CC5, that is, the UE may determine the total quantity 3 of the scheduled carriers of the base station.

S708: The UE sends HARQ information to the base station according to the total quantity of the scheduled carriers, the number of the preceding scheduled carrier of the at least one current scheduled carrier, and the number of the next scheduled carrier of the at least one current scheduled carrier.

A quantity of bits of the HARQ information is equal to a sum of quantities of bits that are needed to feedback whether data sent by using all the scheduled carriers is correctly received. After obtaining the total quantity of the scheduled carriers, the number of the preceding scheduled carrier of the at least one current scheduled carrier, and the number of the next scheduled carrier of the at least one current scheduled carrier, the UE may send the HARQ information to the base station according to the total quantity of the scheduled carriers, the number of the preceding scheduled carrier of the at least one current scheduled carrier, and the number of the next scheduled carrier of the at least one current scheduled carrier, to feedback whether the UE correctly receives data that is sent by the base station by using all the scheduled carriers.

It should be noted that, in this embodiment of the present invention, the UE may send the HARQ information to the base station by using a primary carrier, or may send the HARQ information to the base station by using a primary carrier and one secondary carrier. This embodiment of the present invention does not limit a carrier used to send the HARQ information. A specific carrier used to send the HARQ information may be selected according to needs of an actual application scenario.

Exemplarily, when one bit is needed to feedback whether data sent by using each scheduled carrier is correctly received, using an example in which "1" indicates that the UE correctly receives the data, and "0" indicates that the UE does not correctly receive the data, when the UE receives the DCI separately by using CC0 and CC5, the UE may learn that the base station transmits data separately by using CC0 and CC5, and may learn that the scheduled carriers of the base station are CC0, CC2, and CC5 respectively, that is, the UE may learn the total quantity 3 of the scheduled carriers of the base station. In this way, the UE may determine that the HARQ information sent to the base station has three bits. If the UE correctly receives only data that is sent by the base station by using CC0, the HARQ information sent by the UE to the base station is 100, to indicate that the UE already correctly receives the data that is sent by the base station by using the current scheduled carrier CC0 and does not correctly receive data that is sent by the base station by using the current scheduled carrier CC2 and the current scheduled carrier CC5. After receiving the HARQ information sent by the UE, the base station re-sends, to the UE, the data that is sent by using the current scheduled carrier CC2 and the current scheduled carrier CC5.

It should be noted that, for specific descriptions of S701 to S708 in this embodiment of the present invention, refer to descriptions of S501 to S507, and details are not described in this embodiment of the present invention again.

Figure 9:
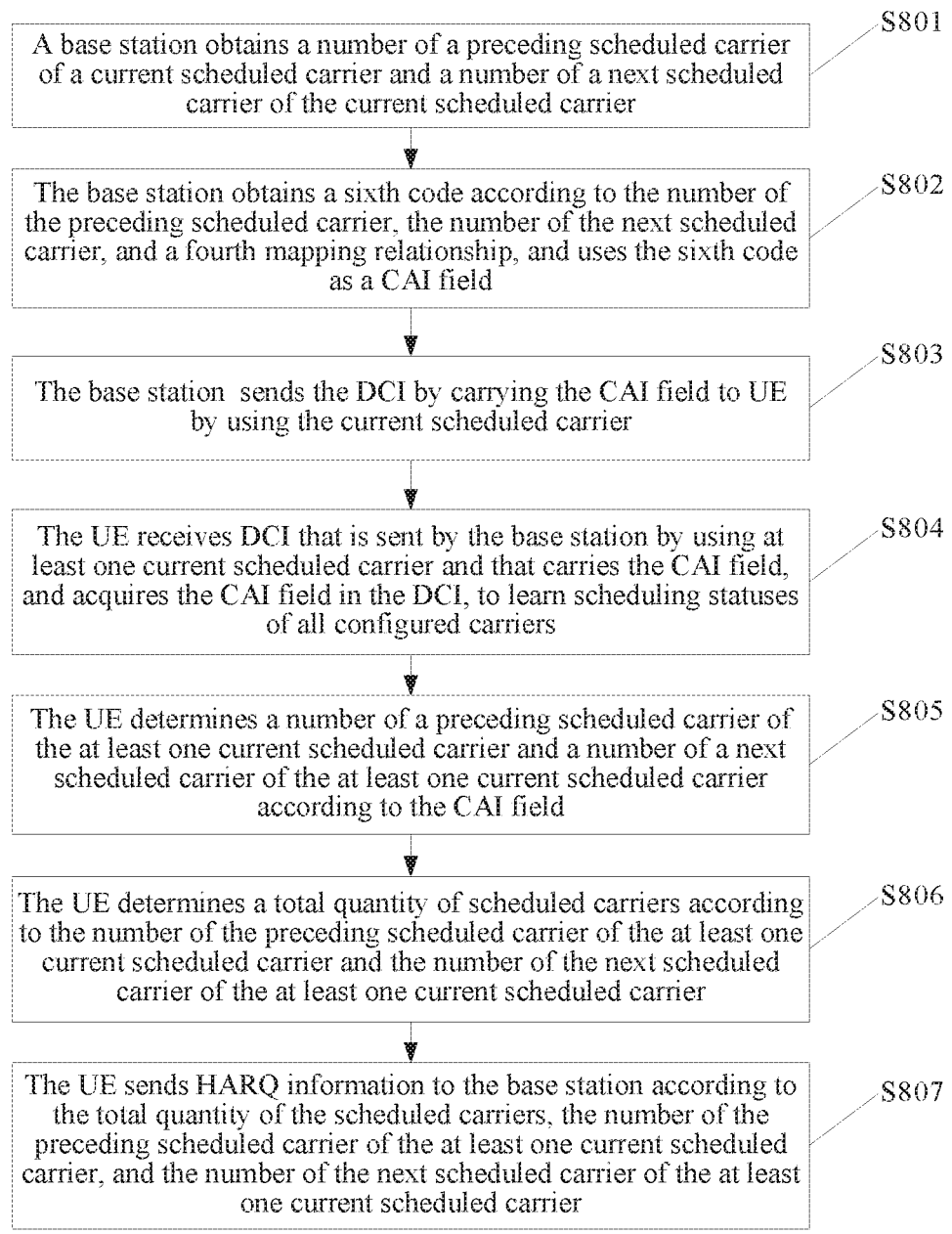
FIG. 9 is a flowchart of another carrier scheduling indication method according to another embodiment of the present invention.

In a fourth implementation manner, for the convenience of understanding by a person skilled in the art, a carrier scheduling indication method provided in an embodiment of the present invention is described by using an example in which there are totally eight configured carriers of a base station, and carriers scheduled by the base station are CC4 and CC5. As shown in FIG. 9, the method may include.

S801: The base station obtains a number of a preceding scheduled carrier of a current scheduled carrier and a number of a next scheduled carrier of the current scheduled carrier.

For example, carriers scheduled by the base station are CC4 and CC5. Therefore, for CC4, a number of a preceding scheduled carrier is 5 and a number of a next scheduled carrier is also 5; for CC5, a number of a preceding scheduled carrier is 4 and a number of a next scheduled carrier is also 4.

S802: The base station obtains a sixth code according to the number of the preceding scheduled carrier, the number of the next scheduled carrier, and a fourth mapping relationship, and uses the sixth code as a CAI field.

After obtaining the number of the preceding scheduled carrier of the current scheduled carrier and the number of the next scheduled carrier of the current scheduled carrier, the base station may obtain the sixth code according to the number of the preceding scheduled carrier, the number of the next scheduled carrier, and the fourth mapping relationship, and use the sixth code as the CAI field. Because there are totally eight configured carriers of the base station and the CAI field may include $\lceil \log_2(C_N^2+1) \rceil$ bits, it may obtained that the CAI field generated by the base station includes five bits.

The base station may put, in one independent table, a fourth mapping relationship corresponding to one scheduled carrier, to be configured in the base station. Exemplarily, for the current scheduled carrier CC4, the fourth mapping relationship corresponding to CC4 is shown in Table 7. The base station searches Table 7 according to the number 5 of the preceding scheduled carrier of CC4 and the number 5 of the next scheduled carrier of CC4, to obtain the sixth code 01111, and uses the obtained sixth code 01111 as the CAI field of CC4. Similarly, for the current scheduled carrier CC5, the base station may search, according to the number 4 of the preceding scheduled carrier of CC5 and the number 4 of the next scheduled carrier of CC5, the fourth mapping relationship corresponding to CC5, to obtain the sixth code, and use the obtained sixth code as the CAI field of CC5. The base station may alternatively put, in one table, fourth mapping relationships corresponding to all scheduled carriers, to be configured in the base station.

TABLE 7

| Number of a preceding scheduled carrier | Number of a next scheduled carrier | CAI field |
| --- | --- | --- |
| 0 | 0 | 00000 |
| 1 | 0 | 00001 |
| 2 | 0 | 00010 |
| 3 | 0 | 00011 |
| 1 | 1 | 00100 |
| 2 | 1 | 00101 |
| 3 | 1 | 00110 |
| 2 | 2 | 00111 |
| 3 | 2 | 01000 |
| 3 | 3 | 01001 |
| 4 | 4 | 01010 |
| 0 | 5 | 01011 |
| 1 | 5 | 01100 |
| 2 | 5 | 01101 |
| 3 | 5 | 01110 |
| 5 | 5 | 01111 |
| 6 | 5 | 10000 |
| 7 | 5 | 10001 |
| 0 | 6 | 10010 |
| 1 | 6 | 10011 |
| 2 | 6 | 10100 |
| 3 | 6 | 10101 |
| 6 | 6 | 10110 |
| 7 | 6 | 10111 |
| 0 | 7 | 11000 |
| 1 | 7 | 11001 |
| 2 | 7 | 11010 |
| 3 | 7 | 11011 |
| 7 | 7 | 11100 |
| Reserved | Reserved | 11101 |
| Reserved | Reserved | 11110 |
| Reserved | Reserved | 11111 |

It should be noted that, values included in Table 7 of this embodiment of the present invention are only exemplary. This embodiment of the present invention does not limit a specific value of a code corresponding to the number of the preceding scheduled carrier, a specific value of a code corresponding to the number of the next scheduled carrier, or a specific reserved code in Table 7. The specific value of the code corresponding to the number of the preceding scheduled carrier, the specific value of the code corresponding to the number of the next scheduled carrier, and the specific reserved code may be correspondingly set according to needs of an actual scenario.

S803: The base station adds the CAI field to DCI and sends the DCI to UE by using the current scheduled carrier.

S804: The UE receives DCI that is sent by the base station by using at least one current scheduled carrier and that carries the CAI field, and obtains the CAI field in the DCI, to learn scheduling statuses of all configured carriers.

The CAI field is the sixth code, and is used to indicate the number of the preceding scheduled carrier of the current scheduled carrier and the number of the next scheduled carrier of the current scheduled carrier.

After receiving the DCI sent by the base station, the UE may receive data according to the DCI. Optionally, to ensure reliability of data transmission, the UE may send HARQ information to the base station, to feedback whether the UE correctly receives data that is sent by the base station by using all the scheduled carriers. Therefore, after S804, the method further includes S805 to S807.

S805: The UE determines a number of a preceding scheduled carrier of the at least one current scheduled carrier and a number of a next scheduled carrier of the at least one current scheduled carrier according to the CAI field.

S805 may be specifically: for the CAI field, obtaining, by the UE, the number of the preceding scheduled carrier and the number of the next scheduled carrier according to the sixth code and the fourth mapping relationship.

Exemplarily, if the UE receives the DCI by using CC4, and the CAI field included in the DCI is 01111, the UE searches, according to the sixth code 01111, the fourth mapping relationship corresponding to CC4, for example, Table 7, to obtain the number 5 of the preceding scheduled carrier of CC4 and the number 5 of the next scheduled carrier of CC4. Similarly, if the UE receives the DCI by using CC4, the UE may search, according to the CAI field carried in the DCI, the fourth mapping relationship corresponding to CC5, to obtain the number 4 of the preceding scheduled carrier of CC5 and the number 4 of the next scheduled carrier of CC5.

S806: The UE determines a total quantity of scheduled carriers according to the number of the preceding scheduled carrier of the at least one current scheduled carrier and the number of the next scheduled carrier of the at least one current scheduled carrier.

S807: The UE sends HARQ information to the base station according to the total quantity of the scheduled carriers, the number of the preceding scheduled carrier of the at least one current scheduled carrier, and the number of the next scheduled carrier of the at least one current scheduled carrier.

It should be noted that, for specific descriptions of S801 to S807 in this embodiment of the present invention, refer to descriptions of S701 to S708, and details are not described in this embodiment of the present invention again.

According to the carrier scheduling indication method provided in this embodiment of the present invention, after generating a CAI field of a current scheduled carrier according to scheduling statuses of all configured carriers configured by a base station, the base station adds the generated CAI field to DCI and sends the DCI to UE by using the current scheduled carrier, so that the UE learns the scheduling statuses of all the configured carriers according to the CAI field in the DCI. In the present embodiments, the CAI field that is sent by the base station to the UE and that is used to perform carrier scheduling indication indicates a total quantity of all scheduled carriers and an accumulative index value of the current scheduled carrier, or indicates a number of a preceding scheduled carrier of the current scheduled carrier and a number of a next scheduled carrier of the current scheduled carrier, that is, the CAI field in the present embodiments indicates scheduling information of a scheduled carrier. However, in the prior art, a DAI2 field that is sent by a base station to UE and that is used to perform carrier scheduling indication indicates a scheduling status of each configured carrier in all configured carriers different from the current scheduled carrier. The total quantity of the scheduled carriers of the base station is less than or equal to a total quantity of the configured carriers of the base station. Therefore, compared with the prior art, when the base station configures a relatively large quantity of carriers, a CAI field generated by the base station according to the method provided in this embodiment of the present invention includes a relatively small quantity of bits. In this way, a length of a DCI field is reduced, and signaling overheads are reduced.

In addition, based on a carrier scheduling indication provided in this embodiment of the present invention, the UE may determine, according to the total quantity of the scheduled carriers of the base station, the quantity of bits of the HARQ information sent to the base station. Because the total quantity of the scheduled carriers of the base station is less than or equal to a total quantity of the configured carriers of the base station, compared with the prior art in which UE determines, according to a total quantity of all configured carriers, a quantity of bits of the HARQ information sent to a base station, in the present embodiments, the quantity of bits of the HARQ information is reduced and signaling overheads are reduced.

Figure 10:
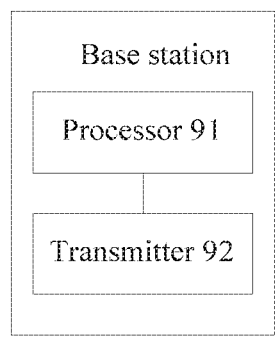
FIG. 10 is a schematic structural diagram of a base station according to another embodiment of the present invention.

An embodiment of the present invention provides a base station. As shown in FIG. 10, the base station includes a processor 91 and a transmitter 92.

The processor 91 is configured to generate a CAI field of a current scheduled carrier according to scheduling statuses of all configured carriers configured by the base station.

The CAI field is used to indicate a total quantity of scheduled carriers in all the configured carriers and an accumulative index value M of the current scheduled carrier, and M represents that the current scheduled carrier is the $M^{th}$ scheduled carrier from the first configured carrier to the current scheduled carrier; or the CAI field is used to indicate a number of a preceding scheduled carrier of the current scheduled carrier and a number of a next scheduled carrier of the current scheduled carrier.

The transmitter 92 is configured to: add the CAI field generated by the processor 91 to DCI, and send the DCI to UE by using the current scheduled carrier.

M is an integer greater than or equal to 1.

In this embodiment of the present invention, further, when the CAI field is used to indicate the total quantity of the scheduled carriers in all the configured carriers and the accumulative index value M of the current scheduled carrier, the processor 91 is specifically configured to: obtain the total quantity of the scheduled carriers, and obtain M; obtain a first code according to the total quantity of the scheduled carriers and a first preset mapping relationship, and obtain a second code according to M and a second preset mapping relationship; and combine the first code and the second code to generate the CAI field.

The first mapping relationship is used to indicate the first code corresponding to the total quantity of the scheduled carriers, and the second mapping relationship is used to indicate the second code corresponding to M.

Optionally, the first code includes $\lceil \log_2 N \rceil$ bits, and the second code includes $\lceil \log_2 N \rceil$ bits.

N is a total quantity of all the configured carriers, and $\lceil \log_2 N \rceil$ represents a value obtained after $\log_2 N$ is rounded up.

In this embodiment of the present invention, further, the processor 91 is further configured to: before obtaining the first code according to the total quantity of the scheduled carriers and the first preset mapping relationship, and obtaining the second code according to M and the second preset mapping relationship, determine whether $\lceil \log_2 N \rceil$ is greater than 2; and the processor 91 is specifically configured to: when $\lceil \log_2 N \rceil$ is not greater than 2, obtain the first code according to the total quantity of the scheduled carriers and the first mapping relationship, and obtain the second code according to M and the second mapping relationship.

In this embodiment of the present invention, further, the processor 91 is further configured to: when $\lceil \log_2 N \rceil$ is greater than 2, obtain the first code according to the total quantity of the scheduled carriers and the first mapping relationship, and obtain a third code according to M and a third preset mapping relationship; and combine the first code and the third code to generate the CAI field.

The third mapping relationship is used to indicate the third code corresponding to M, and a quantity of bits of the third code is less than a quantity of bits of the second code.

In this embodiment of the present invention, further, when the CAI field is generated according to the first code and the second code, a quantity of bits of the CAI field is $2\lceil \log_2 N \rceil$.

The first code is located at first $\lceil \log_2 N \rceil$ bits of the CAI field, and the second code is located at last $\lceil \log_2 N \rceil$ bits of the CAI field; or the first code is located at last $\lceil \log_2 N \rceil$ bits of the CAI field, and the second code is located at first $\lceil \log_2 N \rceil$ bits of the CAI field.

In this embodiment of the present invention, further, when the CAI field is generated according to the first code and the third code, a quantity of bits of the CAI field is $\lceil \log_2 N \rceil + a$.

a is an integer greater than or equal to 2 and less than $\lceil \log_2 N \rceil$. The first code is located at the first $\lceil \log_2 N \rceil$ bits of the CAI field, and the third code is located at the last a bits of the CAI field; or the first code is located at the last $\lceil \log_2 N \rceil$ bits of the CAI field, and the third code is located at the first a bits of the CAI field.

In this embodiment of the present invention, further, when the CAI field is used to indicate the number of the preceding scheduled carrier of the current scheduled carrier and the number of the next scheduled carrier of the current scheduled carrier, the processor 91 is specifically configured to: obtain the number of the preceding scheduled carrier of the current scheduled carrier and the number of the next scheduled carrier of the current scheduled carrier; and generate the CAI field according to the number of the preceding scheduled carrier, the number of the next scheduled carrier, and a fourth preset mapping relationship.

In this embodiment of the present invention, further, the fourth mapping relationship is used to indicate a fourth code corresponding to the number of the preceding scheduled carrier and a fifth code corresponding to the number of the next scheduled carrier; and the processor 91 is specifically configured to: obtain the fourth code according to the number of the preceding scheduled carrier and the fourth mapping relationship, and obtain the fifth code according to the number of the next scheduled carrier and the fourth mapping relationship; and combine the fourth code and the fifth code to generate the CAI field.

In this embodiment of the present invention, further, the fourth mapping relationship is used to indicate a sixth code that is obtained after joint coding is performed on the number of the preceding scheduled carrier and the number of the next scheduled carrier; and a quantity of bits of the sixth code is less than a sum of a quantity of bits of the fourth code and a quantity of bits of the fifth code; and the processor 91 is specifically configured to: obtain the sixth code according to the number of the preceding scheduled carrier, the number of the next scheduled carrier, and the fourth mapping relationship, and use the sixth code as the CAI field.

In this embodiment of the present invention, further, when the CAI field is generated according to the fourth code and the fifth code, a quantity of bits of the CAI field is $2\lceil \log_2 N \rceil$.

The fourth code is located at first $\lceil \log_2 N \rceil$ bits of the CAI field, and the fifth code is located at last $\lceil \log_2 N \rceil$ bits of the CAI field; or the fourth code is located at last $\lceil \log_2 N \rceil$ bits of the CAI field, and the fifth code is located at the $\lceil \log_2 N \rceil$ bits of the CAI field.

In this embodiment of the present invention, further, when the sixth code is used as the CAI field, a quantity of bits of the CAI field may be $\lceil \log_2(C_N^2+1) \rceil$. For a specific coding scheme of the sixth code, refer to an implementation manner of the present embodiments described in FIG. 9 in the foregoing specification.

It should be noted that, for specific working processes of the functional modules of the base station in this embodiment of the present invention, refer to specific descriptions of a corresponding process in a method embodiment, and details are not described in this embodiment of the present invention again.

According to the base station provided in this embodiment of the present invention, after generating a CAI field of a current scheduled carrier according to scheduling statuses of all configured carriers configured by the base station, the base station adds the generated CAI field to DCI and sends the DCI to UE by using the current scheduled carrier. In the present embodiments, the CAI field that is sent by the base station to the UE and that is used to perform carrier scheduling indication indicates a total quantity of all scheduled carriers and an accumulative index value of the current scheduled carrier, or indicates a number of a preceding scheduled carrier of the current scheduled carrier and a number of a next scheduled carrier of the current scheduled carrier, that is, the CAI field in the present embodiments indicates scheduling information of a scheduled carrier. However, in the prior art, a DAI2 field that is sent by a base station to UE and that is used to perform carrier scheduling indication indicates a scheduling status of each configured carrier in all configured carriers different from the current scheduled carrier. The total quantity of the scheduled carriers of the base station is less than or equal to a total quantity of the configured carriers of the base station. Therefore, compared with the prior art, when the base station configures a relatively large quantity of carriers, a CAI field generated by the base station according to a method provided in an embodiment of the present invention includes a relatively small quantity of bits. In this way, a length of a DCI field is reduced, and signaling overheads are reduced.

Figure 11:
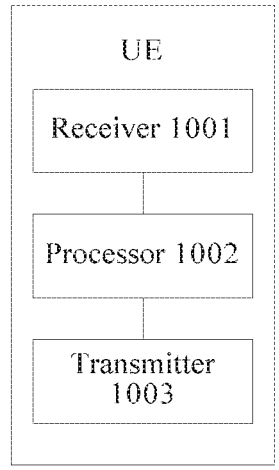
FIG. 11 is a schematic structural diagram of UE according to another embodiment of the present invention.

Another embodiment of the present invention provides UE. As shown in FIG. 11, the UE may include a receiver 1001 and a processor 1002.

The receiver 1001 is configured to receive DCI that is sent by a base station by using at least one current scheduled carrier and that carries a CAI field.

The CAI field is used to indicate a total quantity of scheduled carriers in all configured carriers configured by the base station and an accumulative index value M of the current scheduled carrier, and M represents that the current scheduled carrier is the $M^{th}$ scheduled carrier from the first configured carrier to the current scheduled carrier; or the CAI field is used to indicate a number of a preceding scheduled carrier of the current scheduled carrier and a number of a next scheduled carrier of the current scheduled carrier.

The processor 1002 is configured to obtain the CAI field in the DCI received by the receiver 1001, to learn scheduling statuses of all the configured carriers.

In this embodiment of the present invention, further, the UE may further include a transmitter 1003.

The transmitter 1003 is configured to: after the processor 1002 obtains the CAI field in the DCI, send HARQ information to the base station.

The HARQ information is used to feedback whether the UE correctly receives data that is sent by the base station by using all the scheduled carriers, and a quantity of bits of the HARQ information is equal to a sum of quantities of bits that are needed to feedback whether the data sent by using all the scheduled carriers is correctly received.

In this embodiment of the present invention, further, when the CAI field is used to indicate the total quantity of the scheduled carriers in all the configured carriers configured by the base station and the accumulative index value M of the current scheduled carrier, in a possible implementation manner, the CAI field includes a first code and a second code, where the first code is a code obtained by the base station according to the total quantity of the scheduled carriers and a first preset mapping relationship, the first mapping relationship is used to indicate the first code corresponding to the total quantity of the scheduled carriers, the second code is a code obtained by the base station according to M and a second preset mapping relationship, and the second mapping relationship is used to indicate the second code corresponding to M; or in a second possible implementation manner, the CAI field includes a first code and a third code, where the third code is a code obtained by the base station according to M and a third preset mapping relationship, the third mapping relationship is used to indicate the third code corresponding to M, and a quantity of bits of the third code is less than a quantity of bits of a second code.

In this embodiment of the present invention, further, when the CAI field is used to indicate the number of the preceding scheduled carrier of the current scheduled carrier and the number of the next scheduled carrier of the current scheduled carrier, in a possible implementation manner, the CAI field includes a fourth code and a fifth code, where the fourth code is a code obtained by the base station according to the number of the preceding scheduled carrier and a fourth preset mapping relationship, the fifth code is a code obtained by the base station according to the number of the next scheduled carrier and the fourth mapping relationship, and the fourth mapping relationship is used to indicate the fourth code corresponding to the number of the preceding scheduled carrier and the fifth code corresponding to the number of the next scheduled carriers; or in another possible implementation manner, the CAI field is a sixth code, where the sixth code is a code obtained by the base station according to the number of the preceding scheduled carrier, the number of the next scheduled carrier, and a fourth preset mapping relationship, and the fourth mapping relationship is used to indicate the sixth code that is obtained after joint coding is performed on the number of the preceding scheduled carrier and the number of the next scheduled carrier.

In this embodiment of the present invention, further, the processor 1002 is further configured to determine the total quantity of the scheduled carriers and the accumulative index value M of the at least one current scheduled carrier according to the CAI field; and the transmitter 1003 is specifically configured to send the HARQ information to the base station according to the total quantity of the scheduled carriers and the accumulative index value M of the at least one current scheduled carrier that are determined by processor 1002.

In this embodiment of the present invention, further, the processor 1002 is further configured to: determine the number of the preceding scheduled carrier of the at least one current scheduled carrier and the number of the next scheduled carrier of the at least one current scheduled carrier according to the CAI field, and determine the total quantity of the scheduled carriers according to the number of the preceding scheduled carrier of the at least one current scheduled carrier and the number of the next scheduled carrier of the at least one current scheduled carrier; and the transmitter 1003 is specifically configured to send the HARQ information to the base station according to the total quantity of the scheduled carriers, the number of the preceding scheduled carrier of the at least one current scheduled carrier, and the number of the next scheduled carrier of the at least one current scheduled carrier that are determined by the processor 1002.

In this embodiment of the present invention, further, when the CAI field includes the first code and the second code, the processor 1002 is specifically configured to: for the CAI field, obtain the total quantity of the scheduled carriers according to the first mapping relationship and the first code, and obtain M according to the second mapping relationship and the second code.

In this embodiment of the present invention, further, when the CAI field includes the first code and the third code, the processor 1002 is specifically configured to: for the CAI field, obtain the total quantity of the scheduled carriers according to the first mapping relationship and the first code, and obtain M according to the third mapping relationship and the third code.

In this embodiment of the present invention, further, when the CAI field includes the fourth code and the fifth code, the processor 1002 is specifically configured to: for the CAI field, obtain the number of the preceding scheduled carrier according to the fourth code and the fourth mapping relationship, and obtain the number of the next scheduled carrier according to the fifth code and the fourth mapping relationship.

In this embodiment of the present invention, further, when the CAI field is the sixth code, the processor 1002 is specifically configured to: for the CAI field, obtain the number of the preceding scheduled carrier and the number of the next scheduled carrier according to the sixth code and the fourth mapping relationship.

It should be noted that, for specific working processes of the functional modules of the UE in this embodiment of the present invention, refer to specific descriptions of a corresponding process in a method embodiment, and details are not described in this embodiment of the present invention again.

According to the UE provided in this embodiment of the present invention, the UE receives DCI that is sent by a base station by using at least one current scheduled carrier and that carries a CAI field, and obtains the CAI field in the DCI, to learn scheduling statuses of all configured carriers. In the present embodiments, the CAI field received by the UE indicates a total quantity of scheduled carriers in all configured carriers configured by the base station and an accumulative index value of the current scheduled carrier, or indicates a number of a preceding scheduled carrier of the current scheduled carrier and a number of a next scheduled carrier of the current scheduled carrier, that is, the CAI field in the present embodiments indicates scheduling information of a scheduled carrier. However, in the prior art, a DAI2 field that is sent by a base station to UE and that is used to perform carrier scheduling indication indicates a scheduling status of each configured carrier in all configured carriers different from the current scheduled carrier. The total quantity of the scheduled carriers of the base station is less than or equal to a total quantity of the configured carriers of the base station. Therefore, compared with the prior art, when the base station configures a relatively large quantity of carriers, a CAI field generated by the base station according to a method provided in an embodiment of the present invention includes a relatively small quantity of bits. In this way, a length of a DCI field is reduced, and signaling overheads are reduced.

In addition, based on a carrier scheduling indication provided in this embodiment of the present invention, the UE may determine, according to the total quantity of the scheduled carriers of the base station, the quantity of bits of the HARQ information sent to the base station. The total quantity of the scheduled carriers of the base station is less than or equal to a total quantity of the configured carriers of the base station. Therefore, compared with the prior art in which the UE determines, according to a total quantity of all configured carriers, a quantity of bits of HARQ information sent to the base station, in the present embodiments, the quantity of bits of the HARQ information is reduced and signaling overheads are reduced.

According to the descriptions of the foregoing implementation manners, it may be clearly understood by a person skilled in the art that, for a purpose of convenient and brief description, only the foregoing functional module division is used as an example for description. In an actual application, the foregoing functions are assigned to different functional modules for implementation as required, that is, an inner structure of the apparatus is divided into different functional modules to implement all or a part of the functions described above. For a specific working process of the foregoing apparatus, refer to a corresponding process in the foregoing method embodiments, and details are not described herein again.

In the several embodiments provided in the present application, it should be understood that the disclosed apparatus and method may be implemented in other manners. For example, the described apparatus embodiment is only exemplary. For example, the module or unit division is only logical function division and may be other division in actual implementation. For example, multiple units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one physical unit or more physical units, that is, the parts may be located in one place, or may be distributed in multiple different places. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

If the integrated unit is implemented in the form of a software functional unit and sold or used as an independent product, the integrated unit may be stored in a computer-readable storage medium. Based on such an understanding, the technical solutions of the present embodiments essentially, or the part contributing to the prior art, or all or a part of the technical solutions may be implemented in the form of a software product. The software product is stored in a storage medium and includes several instructions for instructing a device (which may be a single-chip microcomputer. a chip, or the like) or a processor to perform all or a part of the steps of the methods described in the embodiments of the present invention. The foregoing storage medium includes any medium that can store program code, such as a universal serial bus (USB) flash drive, a removable hard disk, a read-only memory (ROM for short), a random access memory (RAM for short), a magnetic disc, or an optical disc.

The foregoing descriptions are only specific embodiments of the present invention, but are not intended to limit the protection scope of the present embodiments. Any variation or replacement readily figured out by a person skilled in the art within the technical scope

What is claimed is:

1. A base station, comprising:
   a processor; and
   a non-transitory computer readable storage medium storing a program for execution by the processor, the program including instructions to:
   generate a carrier assignment indication field, wherein the carrier assignment indication field comprises a first code indicating a total quantity of scheduled carriers and a second code indicating an accumulative number M, wherein M represents an accumulative number of scheduled carriers up to a current scheduled carrier, and M is an integer greater than or equal to 1; and
   send, to a user equipment (UE), a downlink control information (DCI) comprising the carrier assignment indication field.

2. The base station according to claim 1, wherein the second code is two bits in length.

3. The base station according to claim 1, wherein the first code is obtained according to the total quantity of scheduled carriers and a first mapping relationship, and the second code is obtained according to M and a second mapping relationship.

4. The base station according to claim 3, wherein the second mapping relationship comprises:
   the second code is 00, and M is 1, 5, 9, or 13;
   the second code is 01, and M is 2, 6, 10, or 14;
   the second code is 10, and M is 3, 7, 11, or 15; or
   the second code is 11, and M is 4, 8, 12, or 16.

5. The base station according to claim 1, wherein configured carriers comprise the scheduled carriers, and the scheduled carriers are used to transmit data to and/or receive data from the UE, and the configured carriers are respectively associated with indexes which are in ascending order.

6. The base station according to claim 1, wherein the first code and the second code are different bits of the carrier assignment indication field.

7. The base station according to claim 1, wherein a value of the first code indicates the total quantity of scheduled carriers and a value of the second code indicates the accumulative number M.

8. A user equipment (UE), comprising:
a processor; and
a non-transitory computer readable storage medium storing a program for execution by the processor, the program including instructions to:
receive a downlink control information (DCI) from a base station, wherein the DCI comprises a carrier assignment indication field, wherein the carrier assignment indication field comprises a first code indicating a total quantity of scheduled carriers and a second code indicating an accumulative number M, and wherein M represents an accumulative number of scheduled carriers up to a current scheduled carrier, and M is an integer greater than or equal to 1.

9. The UE according to claim 8, wherein the instructions further comprise instructions to:
send hybrid automatic repeat request (HARQ) information to the base station; and
wherein the HARQ information indicates whether the UE correctly receives data from the base station, and wherein a quantity of bits of the HARQ information is equal to a sum of quantities of bits to feedback whether the data sent using scheduled carriers is correctly received.

10. The UE according to claim 9, wherein the instructions further comprise instructions to:
determine the total quantity of scheduled carriers or M according to the carrier assignment indication field; and
wherein the instructions to send the HARQ information to the base station comprise instructions to send the HARQ information to the base station according to the total quantity of scheduled carriers and according to M.

11. The UE according to claim 10, wherein the instructions to determine M comprise instructions to obtain M according to a mapping relationship and according to the second code comprised in the carrier assignment indication field.

12. The UE according to claim 11, wherein the mapping relationship comprises:
the second code is 00, and M is 1, 5, 9, or 13;
the second code is 01, and M is 2, 6, 10, or 14;
the second code is 10, and M is 3, 7, 11, or 15; or
the second code is 11, and M is 4, 8, 12, or 16.

13. The UE according to claim 8, wherein configured carriers comprise the scheduled carriers, and the scheduled carriers are used to transmit data to and/or receive data from the base station, and the configured carriers are respectively associated with indexes which are in ascending order.

14. The UE according to claim 8, wherein the first code and the second code are different bits of the carrier assignment indication field.

15. The UE according to claim 8, wherein a value of the first code indicates the total quantity of scheduled carriers and a value of the second code indicates the accumulative number M.

16. A method comprising:
generating, by a base station, a carrier assignment indication field, wherein the carrier assignment indication field comprises a first code indicating a total quantity of scheduled carriers and a second code indicating an accumulative number M, wherein M represents an accumulative number of scheduled carriers up to a current scheduled carrier, and M is an integer greater than or equal to 1; and
sending, by the base station to a user equipment (UE), a downlink control information (DCI) comprising the carrier assignment indication field.

17. The method according to claim 16, wherein the second code is two bits in length.

18. The method according to claim 16, wherein the first code is obtained according to the total quantity of scheduled carriers and a first mapping relationship, and the second code is obtained according to M and a second mapping relationship.

19. The method according to claim 18, wherein the second mapping relationship comprises:
the second code is 00, and M is 1, 5, 9, or 13;
the second code is 01, and M is 2, 6, 10, or 14;
the second code is 10, and M is 3, 7, 11, or 15; or
the second code is 11, and M is 4, 8, 12, or 16.

20. The method according to claim 16, wherein configured carriers comprise the scheduled carriers, and the scheduled carriers are used to transmit data to and/or receive data from the UE, and the configured carriers are respectively associated with indexes which are in ascending order.

21. The method according to claim 16, wherein a value of the first code indicates the total quantity of scheduled carriers and a value of the second code indicates the accumulative number M.

22. A method comprising:
receiving, by a user equipment (UE), a downlink control information (DCI) from a base station, wherein the DCI comprises a carrier assignment indication field, wherein the carrier assignment indication field comprises a first code indicating a total quantity of scheduled carriers and a second code indicating an accumulative number M, and wherein M represents an accumulative number of scheduled carriers up to a current scheduled carrier, and M is an integer greater than or equal to 1.

23. The method according to claim 22, further comprising:
sending, by the UE, hybrid automatic repeat request (HARQ) information to the base station; and
wherein the HARQ information indicates whether the UE correctly receives data from the base station, and wherein a quantity of bits of the HARQ information is equal to a sum of quantities of bits that feedback whether the data sent using scheduled carriers is correctly received.

24. The method according to claim 23, wherein sending the HARQ information to the base station comprises:
determining, by the UE, the total quantity of scheduled carriers or M according to the carrier assignment indication field; and
sending, by the UE, the HARQ information to the base station according to the total quantity of scheduled carriers and according to M.

25. The method according to claim 24, wherein determining M comprises:
obtaining, by the UE, M for the carrier assignment indication field, according to a mapping relationship and according to the second code.

26. The method according to claim 25, wherein the mapping relationship comprises:
the second code is 00, and M is 1, 5, 9, or 13;

the second code is 01, and M is 2, 6, 10, or 14;
the second code is 10, and M is 3, 7, 11, or 15; or
the second code is 11, and M is 4, 8, 12, or 16.

27. The method according to claim 22, wherein configured carriers comprise the scheduled carriers, and the scheduled carriers are used to transmit data to and/or receive data from the base station, and the configured carriers are respectively associated with indexes which are in ascending order.

28. The method according to claim 22, wherein a value of the first code indicates the total quantity of scheduled carriers and a value of the second code indicates the accumulative number M.

\* \* \* \* \*